(12) United States Patent
Bowles et al.

(10) Patent No.: US 8,590,352 B2
(45) Date of Patent: Nov. 26, 2013

(54) INTEGRAL INSPECTION GAUGE FOR MANUAL CRIMPING TOOL

(75) Inventors: Richard R. Bowles, Solon, OH (US); Robert M. Baracskai, North Ridgeville, OH (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 13/616,040

(22) Filed: Sep. 14, 2012

(65) Prior Publication Data

US 2013/0125610 A1    May 23, 2013

Related U.S. Application Data

(60) Provisional application No. 61/563,313, filed on Nov. 23, 2011.

(51) Int. Cl.
  *B21D 39/04* (2006.01)
  *B21J 9/18* (2006.01)

(52) U.S. Cl.
  USPC ............. 72/31.01; 72/409.01; 72/409.19; 29/237; 29/750; 29/751; 81/367; 81/383

(58) Field of Classification Search
  USPC .............. 72/31.01, 409.01, 409.05, 409.07, 72/409.19; 29/237, 750, 751; 81/367, 371, 81/373, 383
  See application file for complete search history.

(56) References Cited

U.S. PATENT DOCUMENTS

| | | | |
|---|---|---|---|
| 1,456,928 A | | 5/1923 | Lake, Jr. |
| 2,668,464 A | | 2/1954 | Paules |
| 3,525,107 A | | 8/1970 | Hays |
| 3,733,627 A | | 5/1973 | Epstein |
| 3,777,323 A | | 12/1973 | Ingram |
| 4,490,921 A | | 1/1985 | Woods et al. |
| 5,172,737 A | * | 12/1992 | Scruggs et al. ............ 140/123.5 |
| 5,267,464 A | | 12/1993 | Cleland |
| 5,323,502 A | | 6/1994 | Miller |
| 6,073,472 A | * | 6/2000 | Hollingsworth ............ 72/31.01 |
| 6,807,840 B2 | * | 10/2004 | Wilhelm et al. ............... 72/402 |
| 7,503,201 B2 | | 3/2009 | Cleland et al. |
| 2004/0144154 A1 | | 7/2004 | Steiner |
| 2006/0048560 A1 | | 3/2006 | Steiner |
| 2009/0031778 A1 | | 2/2009 | Hamm et al. |
| 2011/0167612 A1 | | 7/2011 | Marshall |

* cited by examiner

*Primary Examiner* — David B Jones
(74) *Attorney, Agent, or Firm* — Mark E. Bandy; Rankin, Hill & Clark, LLP

(57) ABSTRACT

A tool for crimping at least two members together and confirming that the crimp is acceptable. The tool includes a pair of opposed clamping jaws. Each of the clamping jaws has a crimping surface that contacts at least one of the members when crimping the members together. The tool also includes a pair of opposed arms that move the crimping surfaces of the opposed clamping jaws toward one another to define a crimping position and away from one another to define a release position. The tool also includes a gauge that defines a first size determining member that allows receipt of the members crimped together and a second size determining member that rejects receipt of the members crimped together.

22 Claims, 22 Drawing Sheets

VIEW A-A

SECTION B-B
2:1

SECTION E-E
2:1

SECTION C-C
2:1

VIEW D-D

INTEGRAL INSPECTION GAUGE FOR MANUAL CRIMPING TOOL

CROSS REFERENCE TO RELATED APPLICATION(S)

This application claims priority upon U.S. provisional application Ser. No. 61/563,313 filed Nov. 23, 2011.

FIELD

The present subject matter relates to tools. More specifically, the present subject matter relates to a tool for crimping two members together and confirming that the crimp is acceptable.

BACKGROUND

To transport liquids or gases, for example water, hollow pipe or tubing may be used. A variety of techniques may be used to join fittings, valves, couplings, and additional sections of pipe or tubing (hereinafter collectively referred to as "members"). These techniques may include, for example, welding, threading, soldering, and crimping. While each of the techniques has various advantages, crimping allows for a fast and convenient way of joining members together.

With reference to FIGS. 40-43, a crimped assembly 50 is illustrated. When crimping polymeric tubing members 60 to fittings 70 such as unions or flow components such as valves, typically a deformable sleeve or ring 80 such as formed from copper, is slid onto the end of the polymeric member 60. As best shown in FIG. 42, the fitting or flow component 70 is inserted into the end face of the polymeric member 60. Further, the sleeve or ring 80 is positioned to overlie the inserted portion of the fitting or flow component 70. A crimping tool is then coaxially positioned over the sleeve or ring 80, the end portion of the polymeric member 60, and the inserted portion of the union or flow component 70. Then, a force is applied to the tool which radially compresses the assembly 50 together. After crimping, the assembly 50 should satisfy certain dimensional requirements.

A connection which is too large or too small in diameter may leak. And so it is important for the diameter of the crimped assembly 50 to be within a relatively narrow size range. The diameter of the crimped assembly 50 can be checked with gauges. As shown in FIG. 41, the assembly 50 should be large enough in diameter to not fit into a no-go gauge 178. Further, as shown in FIG. 43, the assembly 50 should be small enough in diameter to fit into a go gauge 176. As illustrated, since the assembly 50 did not fit into the no-go gauge 178 and fit into the go gauge 176, the assembly 50 would be considered within tolerance.

Accordingly, at is desirable for the connection or crimped assembly to be checked with a gauge. Many times, due to activity at the jobsite where crimping is occurring, the gauge becomes misplaced or lost. Alternatively, even if the location of the gauge is known, the gauge may not be conveniently located near the crimping location. As such, the user of the tool may be unable or unwilling to retrieve the gauge to confirm that the diameter of the crimped assembly is within specification. This failure to check the crimp can result in an improper connection being undetected, thereby potentially resulting in a subsequent leak at the crimped assembly. Accordingly, a need exists for a tool and/or strategy that addresses these problems.

SUMMARY

The difficulties and drawbacks associated with previously known tools and practices are addressed in the present tool for forming crimped assemblies and confirming that the crimp or resulting connection is acceptable. The tool includes a pair of opposed clamping jaws. Each of the clamping jaws has a crimping surface that contacts at least a portion of the assembly undergoing crimping. The tool also includes a pair of opposed arms that move the crimping surfaces of the opposed clamping jaws toward one another to define a crimping position and away from one another to define a release position. The tool also includes a gauge that defines a first size determining member that allows receipt of the crimped assembly and a second size determining member that rejects receipt of the crimped assembly. The gauge is separate from the crimping surfaces and is attached to one of the arms. The tool also includes a finger spring that provides frictional resistance to the gauge to partially retard rotation of the gauge about the arm to which the gauge is attached.

According to another embodiment of the subject matter, a tool for forming a crimped assembly and confirming that the crimp is acceptable includes a pair of opposed clamping jaws. Each of the clamping jaws includes a crimping surface that contacts at least a portion of the assembly undergoing crimping. The tool also includes a pair of opposed arms that move the crimping surfaces of the opposed clamping jaws toward one another to define a crimping position and away from one another to define a release position. The tool further includes a gauge that defines a first size determining member that allows receipt of the crimped assembly and a second size determining member that rejects receipt of the crimped assembly. The gauge is at least partially received within one of the arms.

According to another aspect of the present subject matter, a tool for forming a crimped assembly and confirming that the crimp is acceptable includes a pair of opposed clamping jaws. Each of the clamping jaws includes a crimping surface that contacts at least a portion of the assembly undergoing crimping. The tool also includes a pair of opposed arms that move the crimping surfaces of the opposed clamping jaws toward one another to define a crimping position and away from one another to define a release position. The tool further includes a gauge that is pivotally attached to one of the arms. The gauge includes a body that defines a first size determining member that allows receipt of the crimped assembly and a second size determining member that rejects receipt of the crimped assembly. The gauge also includes a stop member that limits rotation of the gauge about the arm to which the gauge is pivotally attached.

According to another embodiment of the subject matter, a tool for forming a crimped assembly and confirming that the crimp is acceptable includes a pair of opposed clamping jaws. Each of the clamping jaws has a crimping surface that contacts at least a portion of the assembly undergoing crimping. The tool also includes a pair of opposed arms that move the crimping surfaces of the opposed clamping jaws toward one another to define a crimping position and away from one another to define a release position. The tool also includes a gauge that defines a first size determining member that allows receipt of the crimped assembly and a second size determining member that rejects receipt of the crimped assembly. The gauge is rotatably attached to one of the arms with a gauge pin. The tool also includes a wave washer that is coaxially disposed with the gauge on the gauge pin so as to provide frictional resistance to the gauge to partially retard rotation of the gauge about the arm to which the gauge is attached.

According to another embodiment of the subject matter, a tool for forming a crimped assembly and confirming that the crimp is acceptable includes a pair of opposed clamping jaws. Each of the clamping jaws has a crimping surface that contacts at least a portion of the assembly undergoing crimping. The tool also includes a pair of opposed arms that move the crimping surfaces of the opposed clamping jaws toward one another to define a crimping position and away from one another to define a release position. The tool also includes a gauge that defines a first size determining member that allows receipt of the crimped assembly and a second size determining member that rejects receipt of the crimped assembly. The gauge is selectively removable from one of the arms.

DETAILED DESCRIPTION OF THE EMBODIMENTS

Figure 1:
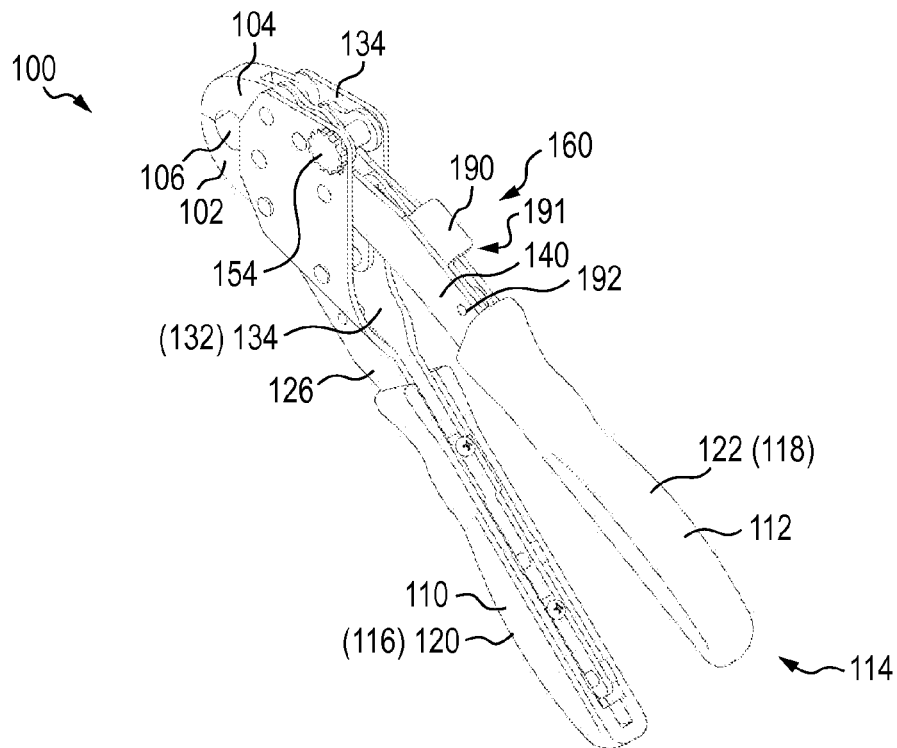
FIG. 1 is a perspective view of a preferred embodiment tool of the present subject matter.

It should, of course, be understood that the description of the drawings herein is merely illustrative and that various modifications and changes can be made in the structures disclosed without departing from the present disclosure. It will also be appreciated that various identified components of the tool disclosed herein are merely terms of art and may vary from one tool to another and should not be deemed to limit the present disclosure. All references to direction and position, unless otherwise indicated, refer to the orientation of the tool in the drawings and should not be construed as limiting the claims appended hereto. Like numerals refer to like parts throughout the several views.

With reference to FIGS. 1-39, a tool 100 is shown. The tool 100 includes a selectively positionable gauge 160 associated with the tool 100. Preferably, the gauge 160 is integrally attached to the tool 100. The tool 100 can be used to form one or more crimped assemblies and confirm that the crimp between the components of the assembly is acceptable.

With reference once again to FIGS. 40-43, a crimped assembly 50 is shown. Non-limiting examples of crimped assemblies 50 include an end of a member 60 such as polymeric tubing, a crimp ring or sleeve 80, and a fitting 70 such as an elbow, a coupling, a union, a reducer, a tee, a cross, a cap, a plug, a nipple, a barb, and the like. Another example of a crimped assembly 50 is an end of a member 60 such as polymeric tubing, a crimp ring or sleeve 80, and a flow component 70 such as a valve, a clean out or other access component, an inline meter or flow sensor, and the like. Crimped assemblies 50 typically include a crimp ring or sleeve 80 that is separate from the fitting or flow component 70. However "quick connect" fittings are known which include an attached sleeve and which define an annular region for receiving an end of polymeric tubing or other member for engagement by crimping. The specification related to crimped assemblies is detailed in *ASTM Standard F* 1807, 2008, *"Standard Specifications for Metal Insert Fittings Utilizing a Copper Crimp Ring for SDR9 Cross-linked Polyethylene (PEX) Tubing,"* ASTM International, West Conshohocken, Pa., and is hereby incorporated by reference.

Generally, the polymeric members in the crimped assemblies are formed from crosslinked polyethylene or also known as "PEX." PEX members are flexible and have been widely used in plumbing applications for years. Although the subject matter is described with reference to PEX, it will be appreciated that the present technology is also applicable to other types of plastics and polymers. In addition, in no way is the present subject matter limited to crimping or forming crimped assemblies involving polymeric members. Instead, it is contemplated that the subject matter could also be used in association with pipes or tubing formed from other deformable materials such as metals, and specifically, copper. While the present subject matter relates specifically to forming crimped assemblies between polymeric members and fittings and/or flow components, it will be understood that this technology could be utilized in other arenas and applications.

The gauge 160 provides dimensional indicators for estimating or determining a range of sizes for circumferential crimping applications, Preferably, and as depicted, the gauge 160 can be in the form of a "Go-No-Go" gauge as that term is understood by those skilled in the art. The gauge 160 serves as an inspection tool to check the extent of crimping or compression applied to a workpiece. The gauge 160 is a measuring tool that does not necessarily return a size in the literal sense, but instead returns a state. Specifically, the gauge 160 provides a series of circumferential indicators. As will be appreciated, each dimensional indicator is provided along the periphery of the gauge 160. The "Go-No-Go" aspect of the gauge 160 can be used to determine whether a circumferential crimped element has been sufficiently compressed about an underlying member. If, after crimping, the crimped element has an outer diameter small enough to fit within the Go indicator (i.e., first size determining member 176) and has an outer diameter that is too large to fit within the corresponding No-Go indicator (i.e., second size determining member 178), then the element has been sufficiently compressed. If however, the crimped element fits in both of the Go and No-Go indicators, then the element has been excessively or overly crimped. If instead, the crimped element does not fit within the Go indicator, then the element has not been sufficiently crimped. The gauge 160 is preferably formed from a relatively flat and thin sheet of a durable material such as metal or certain plastics.

The circumferential indicators of the gauge 160 are preferably slotted openings having a span or access width that corresponds to the desired range of diameters of the circumferential crimping element after crimping. That is, the preferred embodiment gauge 160 defines a collection of openings (i.e., the first size determining member 176 and second size determining member 178), each of which corresponds to a minimum and maximum desired diameter of a circumferential crimping element after crimping as will be described in more detail hereinafter. It is also preferred that the interior portion of each opening define an arcuate edge, and preferably, a semi-circular edge, having a diameter equal or substantially so, to the access width of the respective opening.

While the tool 100 is shown as being hand-actuated, it will be appreciated that the tool 100 could be actuated by other means. The tool 100 includes opposed clamping jaws 102, 104, opposed arms 110, 112, and a gauge 160. Unless otherwise noted, it will be understood that the components of the tool 100 could be made of nearly any suitable material including metal and/or polymeric materials.

The first jaw 102 and the second jaw 104 include a first clamping surface 106 and a second clamping surface 108, respectively. When in a crimping position, the first jaw 102 contacts the second jaw 104, and the first damping surface 106 is nearly continuous with the second clamping surface 108 thereby defining a circular or near-circular shape. The second jaw 104 is moved toward and away from the first jaw 102 by movement of the opposed arms 110, 112 as will be described hereinafter.

When the jaws 102, 104 are closed, the clamping surfaces 106, 108 form a circle or near-circle shape. The diameter of the circle defined by the first clamping surface 106 and the second clamping surface 108 is based upon the size of the members that are to be incorporated in the crimped assembly. In particular, different sized members may need different sized tools so that the members may be properly crimped and/or so that crimped assemblies can be properly formed, i.e. which do not leak. For example, it is known that PEX piping is available in ⅜, ½, ⅝, ¾, 1, and 1¼ inch nominal diameters. Thus, the tool 100 may include different sized clamping surfaces 106, 108 to accommodate the different sized members. It is also understood that other sizes (i.e., different diameters) are possible and contemplated. Further, the first and second clamping surfaces 106, 108 may be heat treated to increase their respective hardness levels.

With continued reference to FIGS. 1-39, the tool 100 includes a first arm 110 and a second arm 112. At an end of the tool 100 that is opposite the clamping jaws 102, 104, is a gripping end 114. As shown in the figures, the gripping end 114 can include grips 116, 118. These grips 116, 118 include gripping surfaces 120, 122, respectively. While the grips 116, 118 are shown to be separate from the arms 110, 112, it will be understood that the grips 116, 118 could be integral with the 110, 112.

The grips 116, 118 may be made from nearly any material including polymers and/or elastomeric compounds. The grips 116, 118 serve to improve usability of the tool 100 by ensuring proper placement of the tool 100 in the hands of a user, reducing slippage of the tool 100 in the user's hands, and providing shock absorbance characteristics. As illustrated, the grips 116, 118 are attached to the arms 110, 112 with fasteners. However, it is understood that other methods of attachment of the grips 116, 118 to the arms 110, 112 are possible and contemplated.

The gripping surfaces 120, 122 are adapted to receive force that is applied by the user. To place the damping jaws 102, 104 and the opposed arms 110, 112 in a crimping position, the second arm 112 is moved toward the first arm 110. As described hereinbefore, this causes the damping jaws 102, 104 to be moved together and form the circle with the first and second damping surfaces 106, 108. Alternatively, to place the tool 100 in a release position, the arm 112 is moved away from the arm 110, thereby causing the jaw 104 to be moved away from the jaw 102. This action causes the first and second clamping surfaces 106, 108 to no longer form a continuous circle.

As particularly shown in FIGS. 4, 10, 15, 20, 26, 30, 34, and 38, the first arm 110 and the second arm 112 are joined by a linkage assembly or force multiplier 152, which transmits the force from the gripping surfaces 120, 122 of the arms 110, 112 to the clamping surfaces 106, 108 of the jaws 102, 104. The linkage or force multiplier 152 is known in the art. For example, the linkage assembly 152 could be similar to the linkage assembly described in the U.S. Pat. No. 5,267,464 to Cleland. Accordingly, it will not be described in detail herein. However, it is understood that any number of linkages could be used to join the first arm 110 to the second arm 112. Alternatively, the arms 110, 112 and the jaws 102, 104 could be simply joined by a pin, similar to a traditional pair of pliers.

The tool 100 can also include an adjusting cam pin 154. The adjusting cam pin 154 allows for adjustment of the linkage 152 to ensure that the jaw 104 contacts the jaw 102. In particular, after the tool 100 is extensively used, movement of the second arm 112 toward the first arm 110 may not result in the jaw 104 and the jaw 102 contacting one another so that the first and second clamping surfaces 106, 108 form the continuous circle described hereinbefore. Thus, the adjusting cam pin 154 may be rotated to adjust the linkage 152 to ensure that the first and second clamping surfaces 106, 108 form the continuous circle when the second arm 112 is moved toward the first arm 110. As will be appreciated, various locks and fixing mechanisms may be used to prevent inadvertent actuation of the adjusting cam pin 154.

The first arm 110 includes a first plate member 126 and a second plate member 132. The first and second plate members 126, 132 include interior surfaces 128, 134, respectively. The interior surface 128 of the first plate member 126 faces the interior surface 134 of the second plate member 132. The first arm 110 may have an angled configuration; however other shapes are possible and contemplated.

The first plate member 126 and the second plate member 132 may be spaced from one another a distance sufficient to allow for receipt of the second arm 112 as will be described herein below. As illustrated, the first jaw 102 is fixed to the first arm 110 and the second jaw 104 is movable in relation to the first jaw 102. Preferably, at least a portion of the first and second jaws 102, 104 are received within the first arm 110.

The second arm 112 includes a first plate member 140 with an interior surface 142 and a second plate member 146 with an interior surface 148. The interior surface 142 of the first plate member 140 of the second arm 112 faces the interior surface 148 of the second plate member 146 of the second arm 112. The second arm 112 is of a generally linear shape. The second arm 112 is at least partially received within the first arm 110 for connection via the linkage 152 to the first arm 110.

Figure 2:
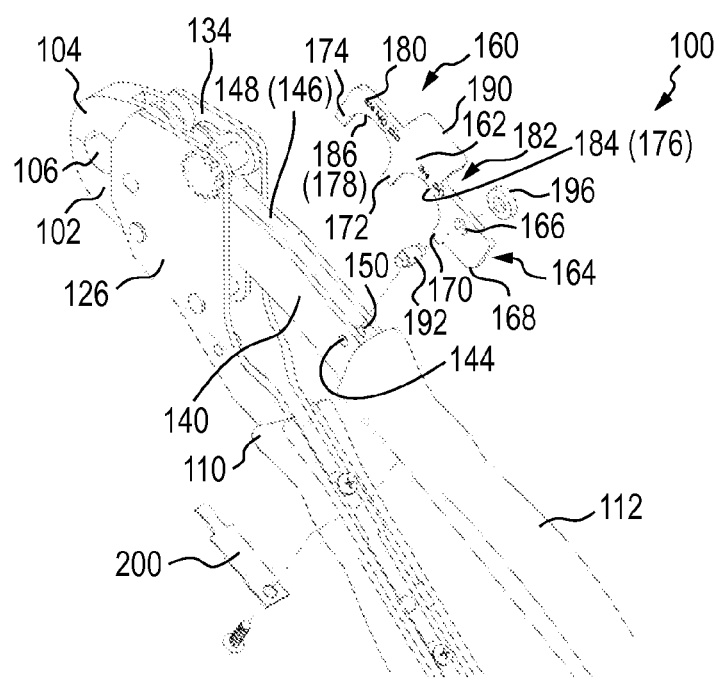
FIG. 2 is a partially exploded view of the tool of FIG. 1.
Figure 3:
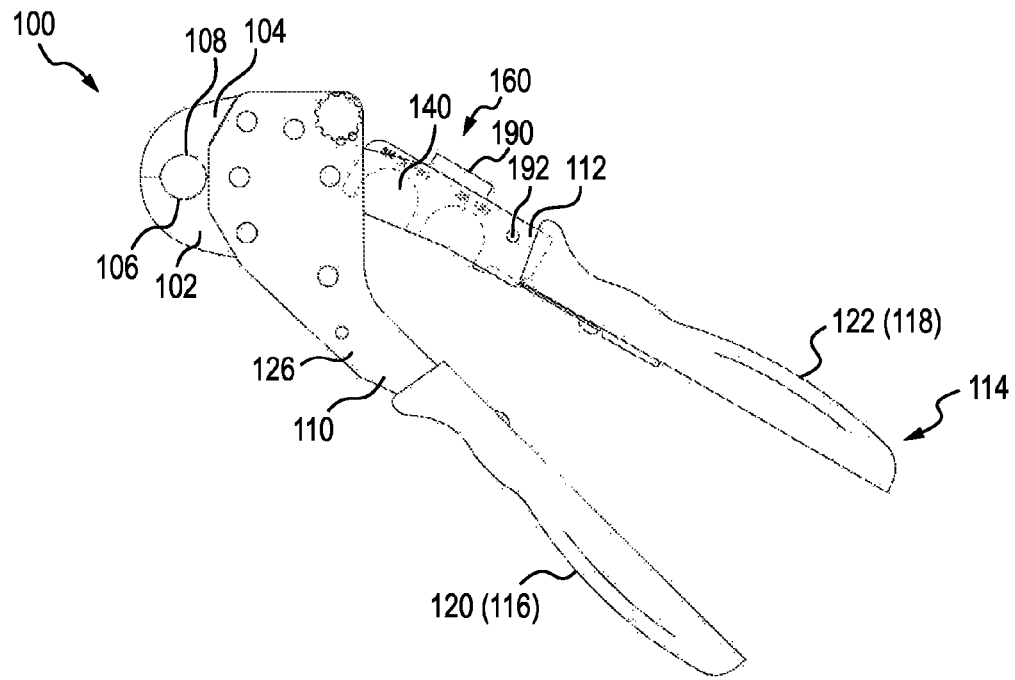
FIG. 3 is an elevational view of the tool of FIG. 1 with a gauge in a stowed position.
Figure 4:
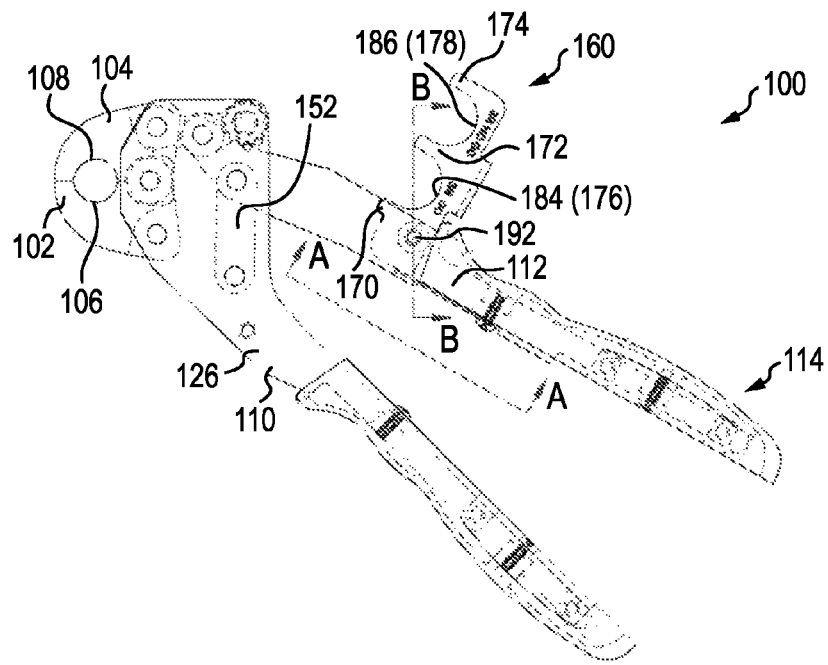
FIG. 4 is an elevational view of the tool of FIG. 1 with the gauge in a measuring position and showing a linkage.
Figure 5:
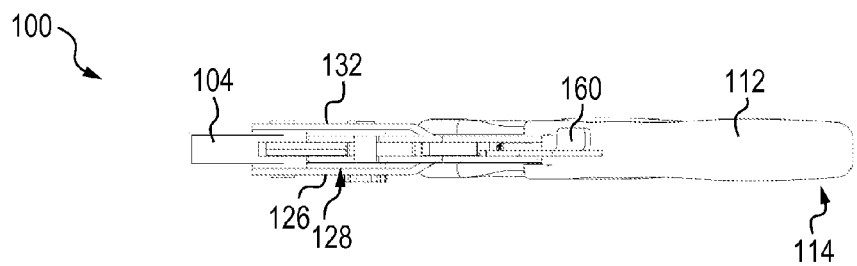
FIG. 5 is a plan view of the tool illustrated in FIG. 4.
Figure 6:
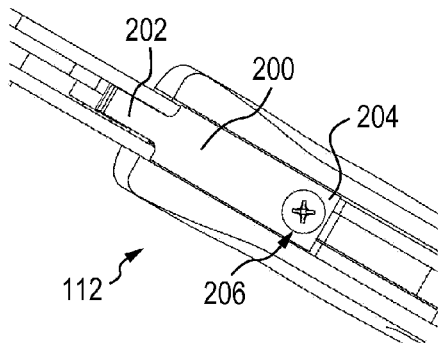
FIG. 6 is a sectional view taken along line A-A of FIG. 4.
Figure 7:
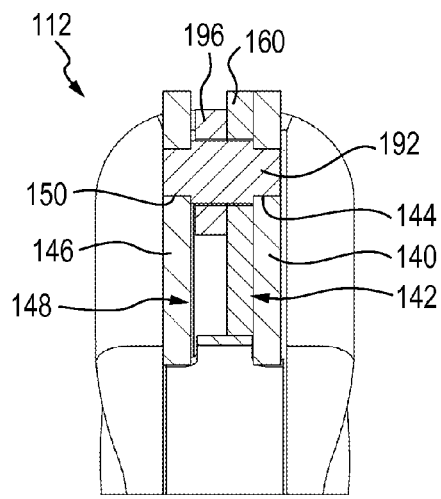
FIG. 7 is a sectional view taken along line B-B of FIG. 4.
Figure 8:
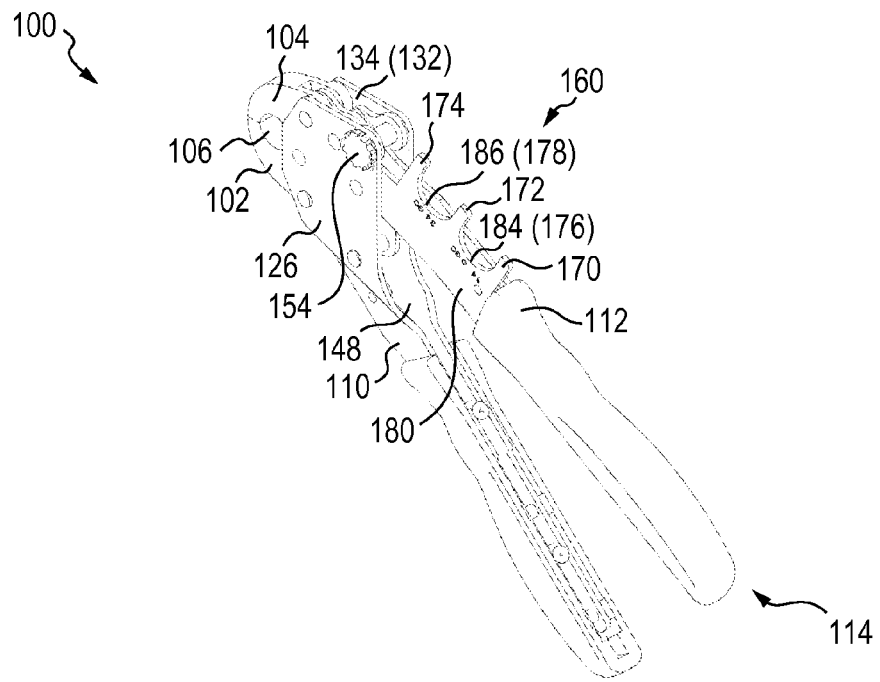
FIG. 8 is a perspective view of another preferred embodiment tool of the present subject matter.
Figure 9:
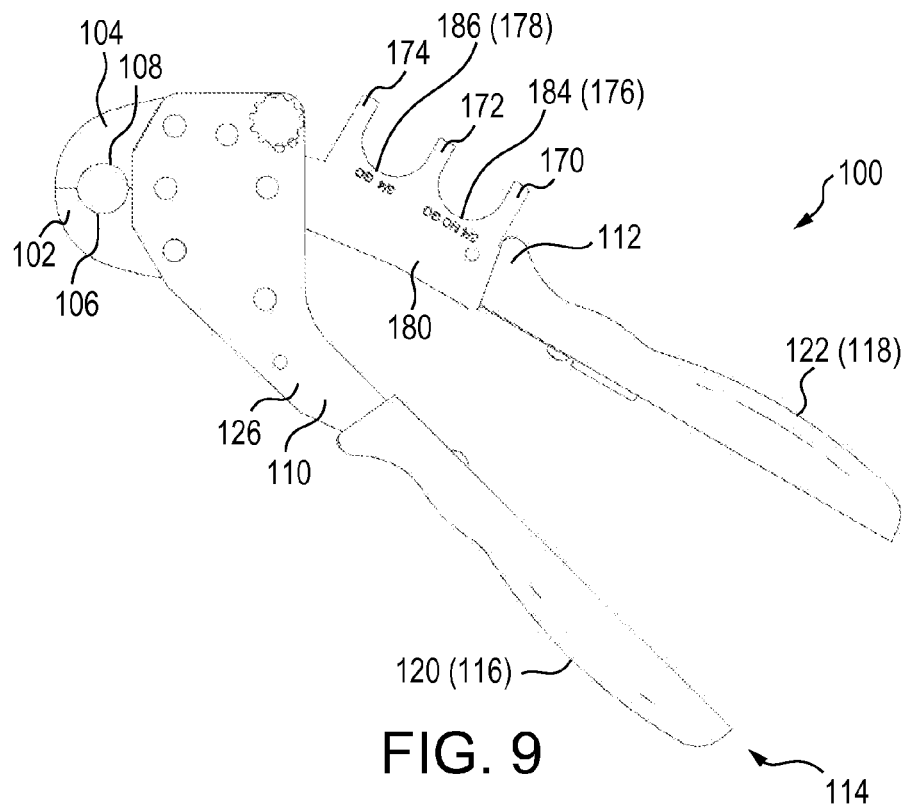
FIG. 9 is an elevational view of the tool of FIG. 8.
Figure 10:
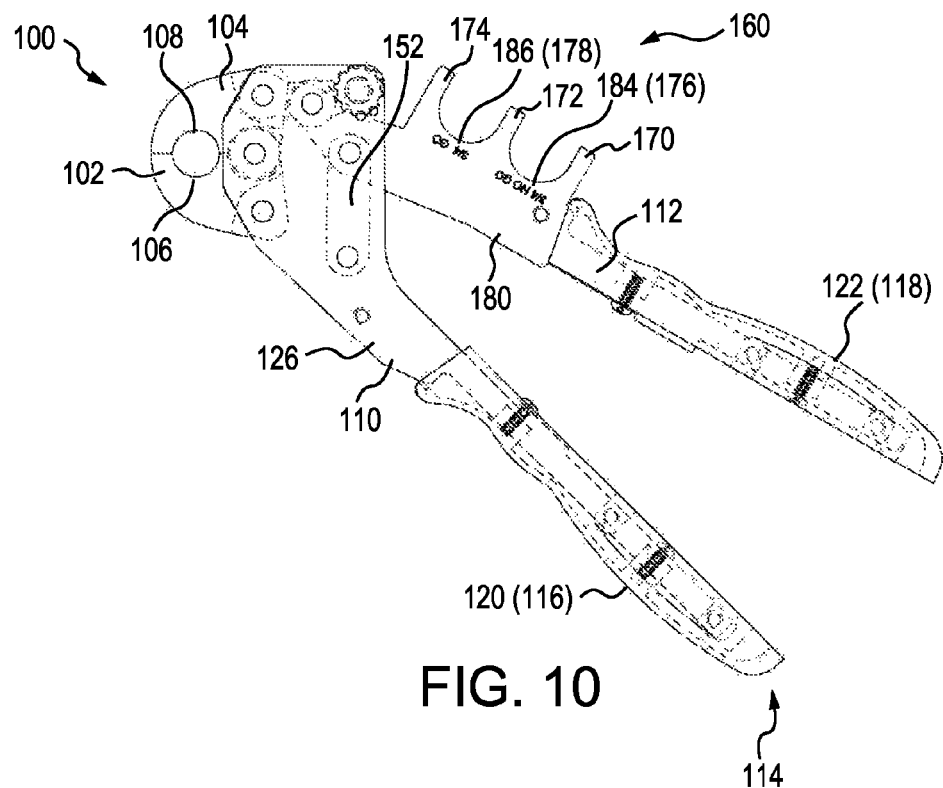
FIG. 10 is an elevational view of the tool of FIG. 8 showing a linkage assembly.
Figure 11:
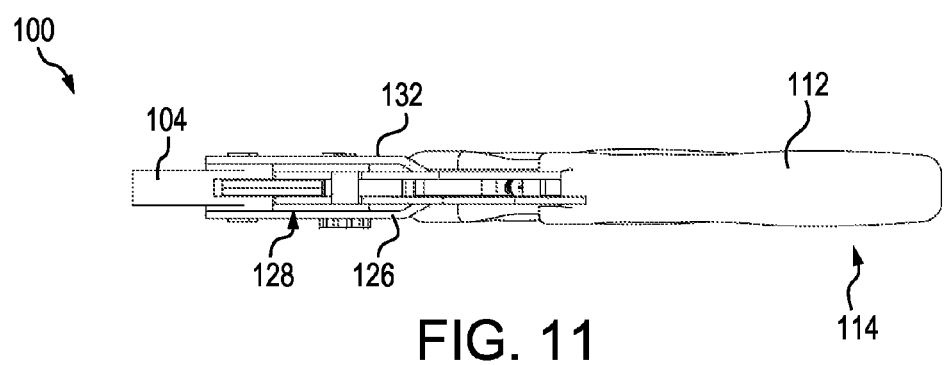
FIG. 11 is a plan view of the tool of FIG. 9.
Figure 12:
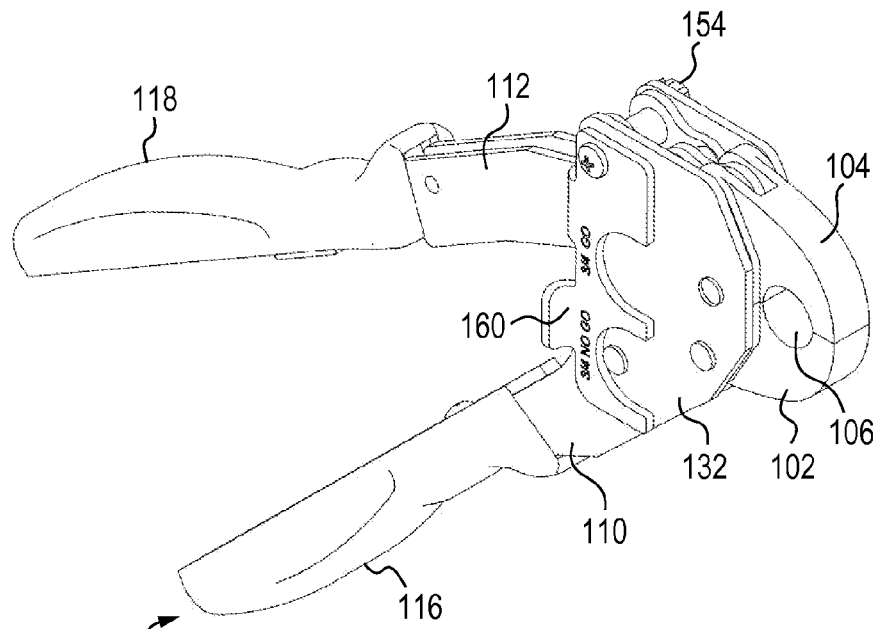
FIG. 12 is a perspective view of another preferred embodiment tool of the present subject matter.
Figure 13:
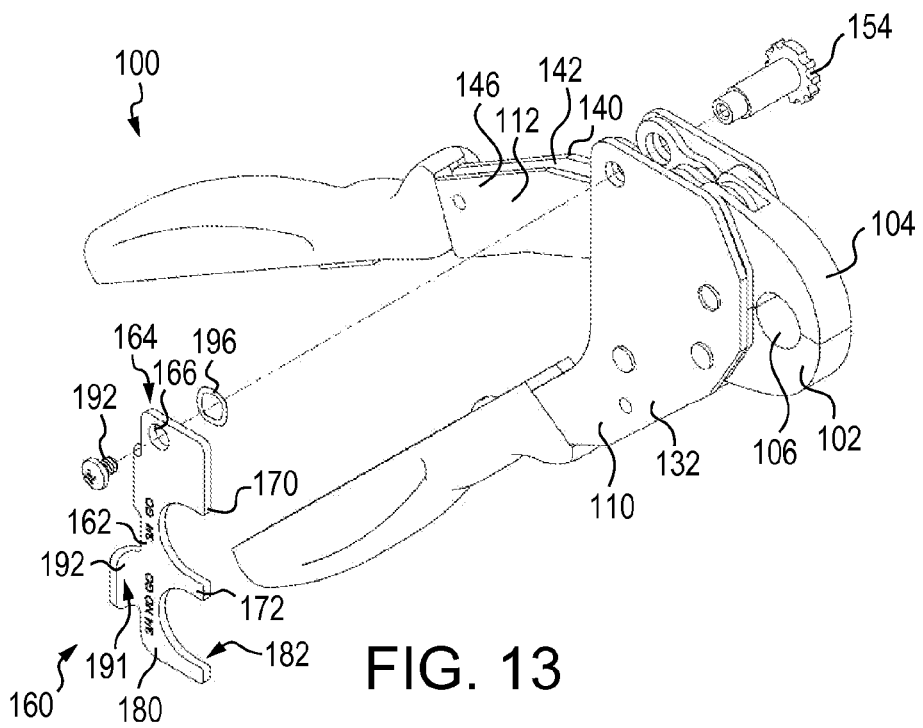
FIG. 13 is a partially exploded view of the tool of FIG. 12.
Figure 14:
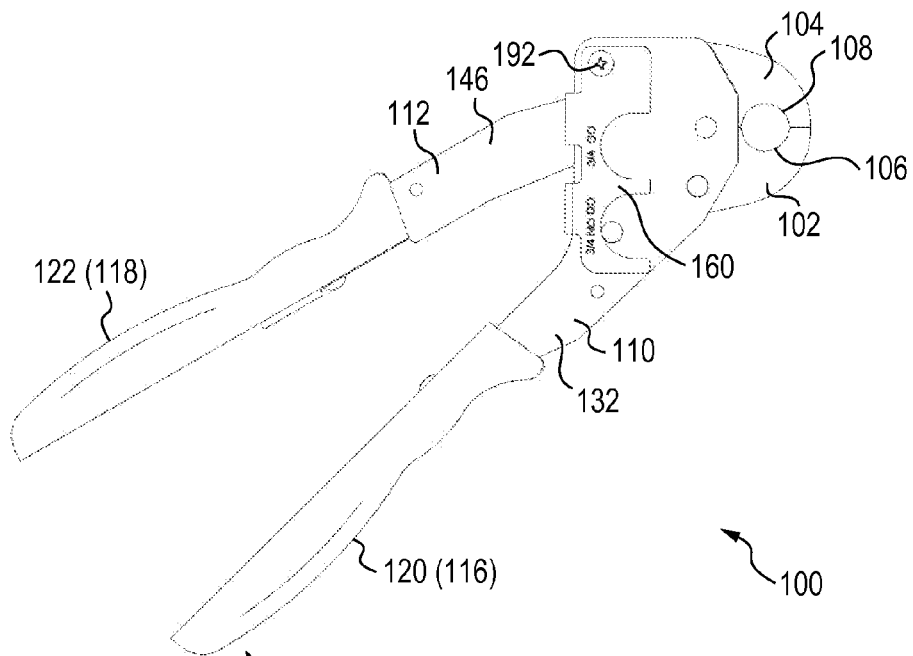
FIG. 14 is an elevational view of the tool of FIG. 12 with a gauge in a stowed position.
Figure 15:
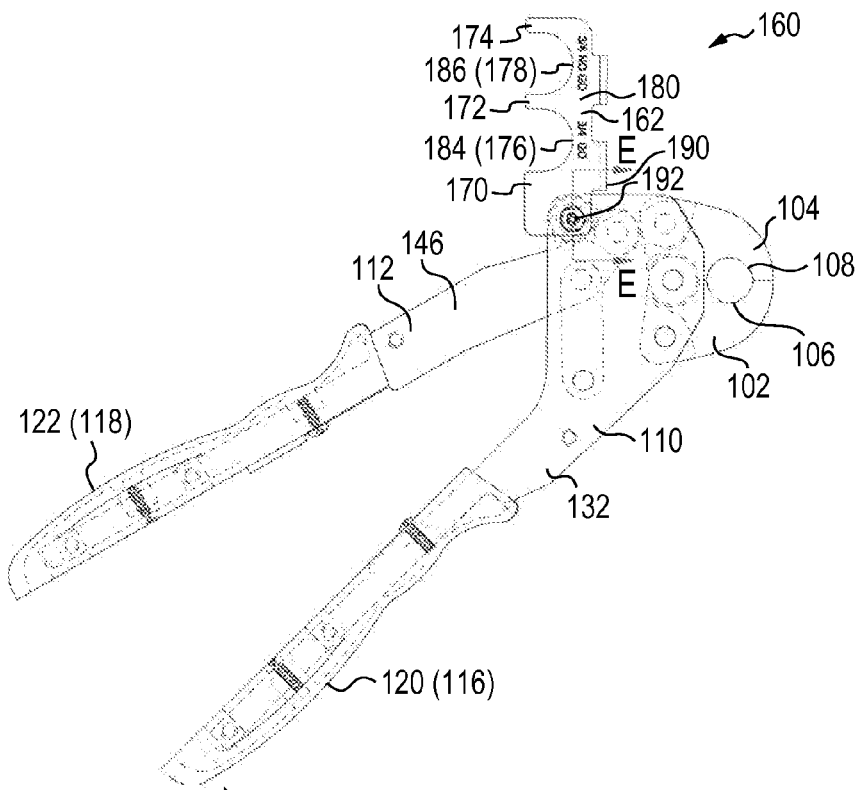
FIG. 15 is an elevational view of the tool of FIG. 12 with a gauge in a measuring position and showing a linkage assembly.
Figure 16:
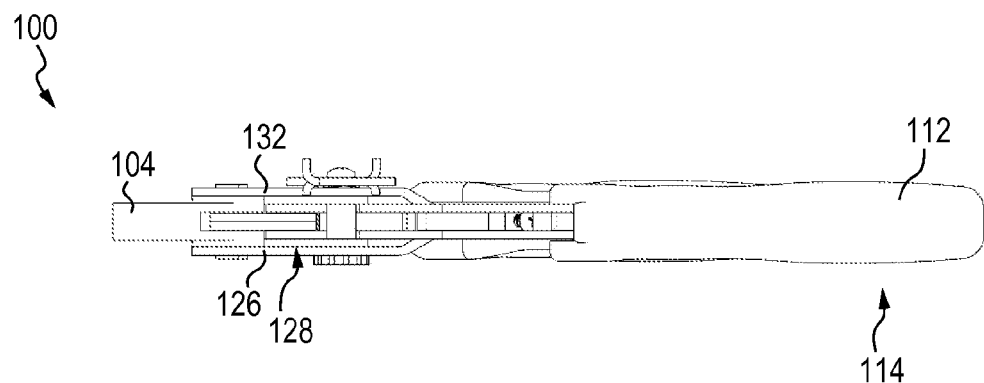
FIG. 16 is a plan view of the tool of FIG. 14.
Figure 17:
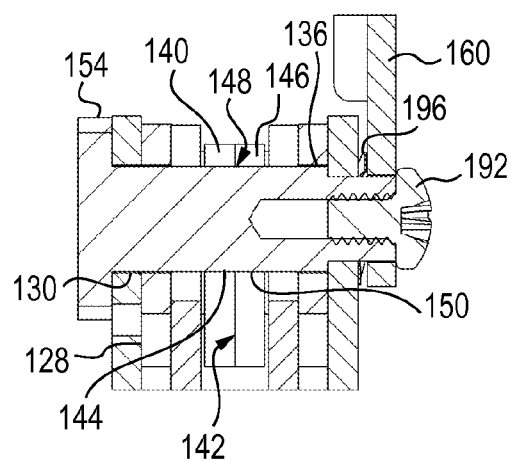
FIG. 17 is a sectional view taken along line E-E of FIG. 15.
Figure 18:
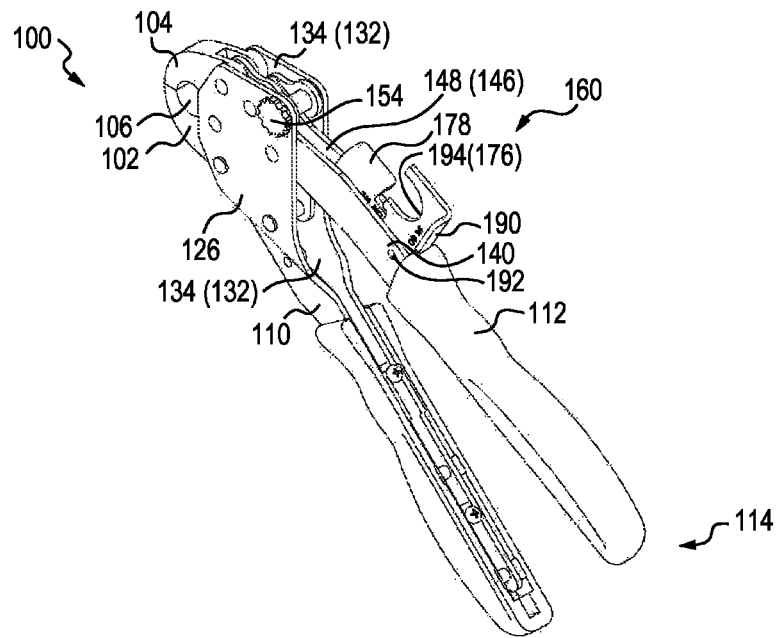
FIG. 18 is a perspective view of another preferred embodiment o of the present subject matter.
Figure 19:
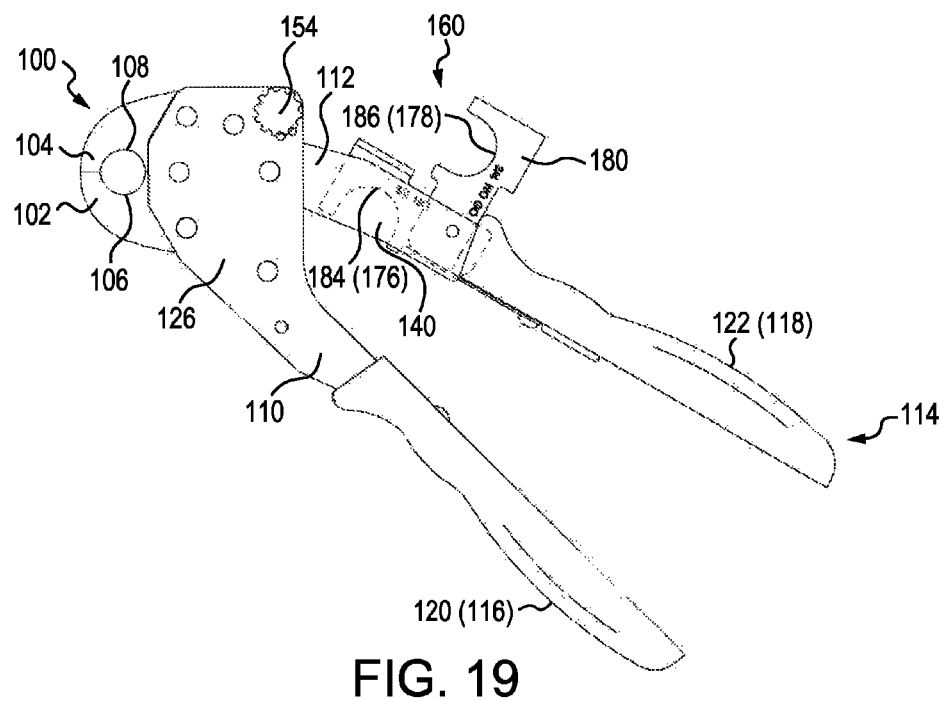
FIG. 19 is an elevational view of the tool of FIG. 18.
Figure 20:
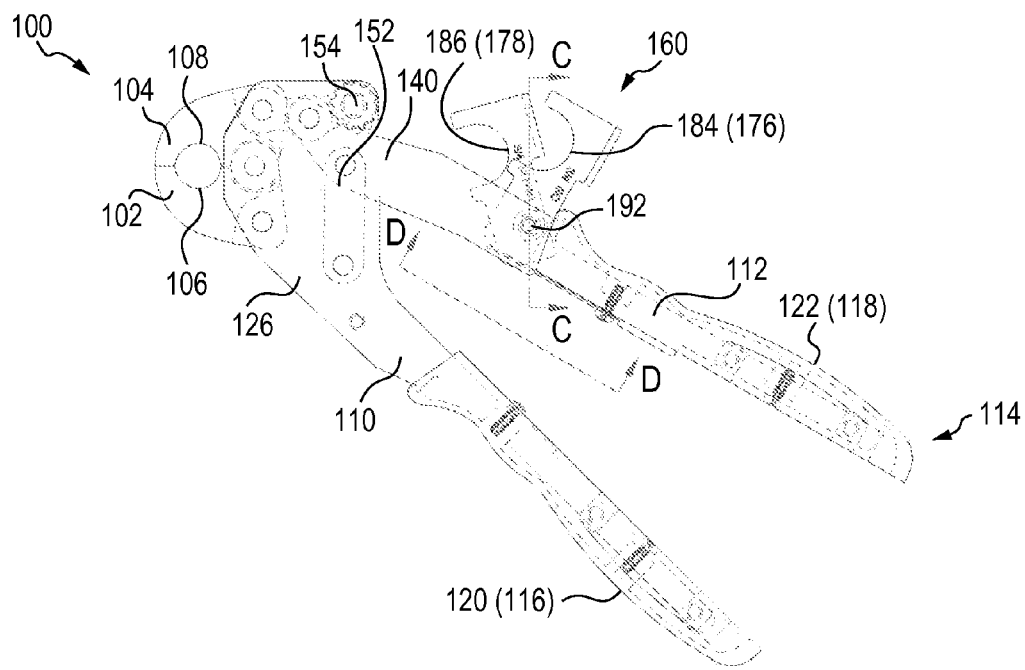
FIG. 20 is an elevational view of the tool of FIG. 18 showing a linkage assembly.
Figure 21:
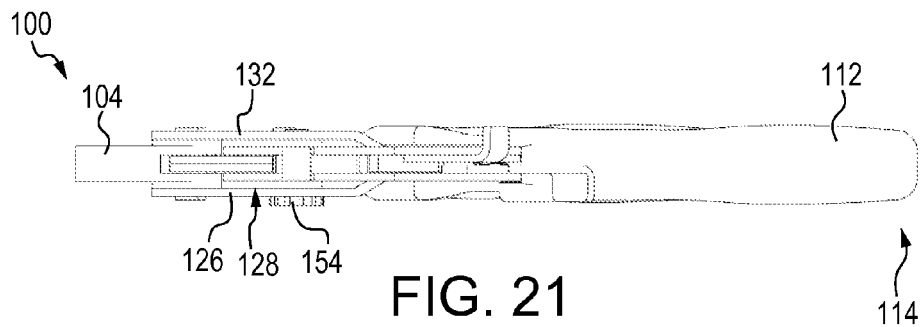
FIG. 21 is a plan view of the tool illustrated in FIG. 19.
Figure 22:
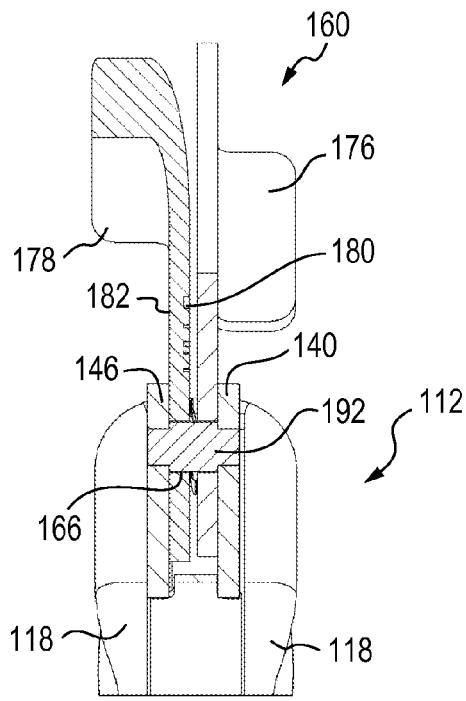
FIG. 22 is a sectional view taken along line C-C of FIG. 20.
Figure 23:
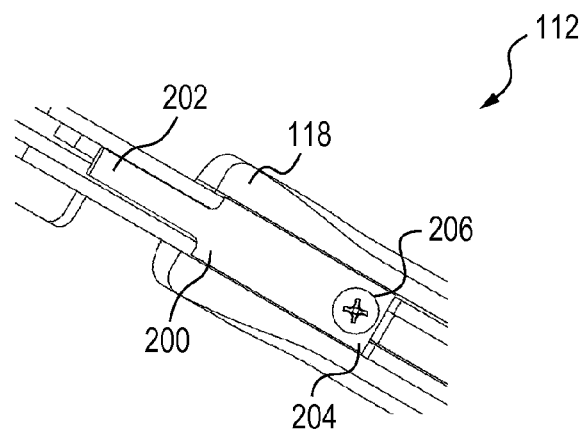
FIG. 23 is a sectional view taken along line D-D of FIG. 20.
Figure 24:
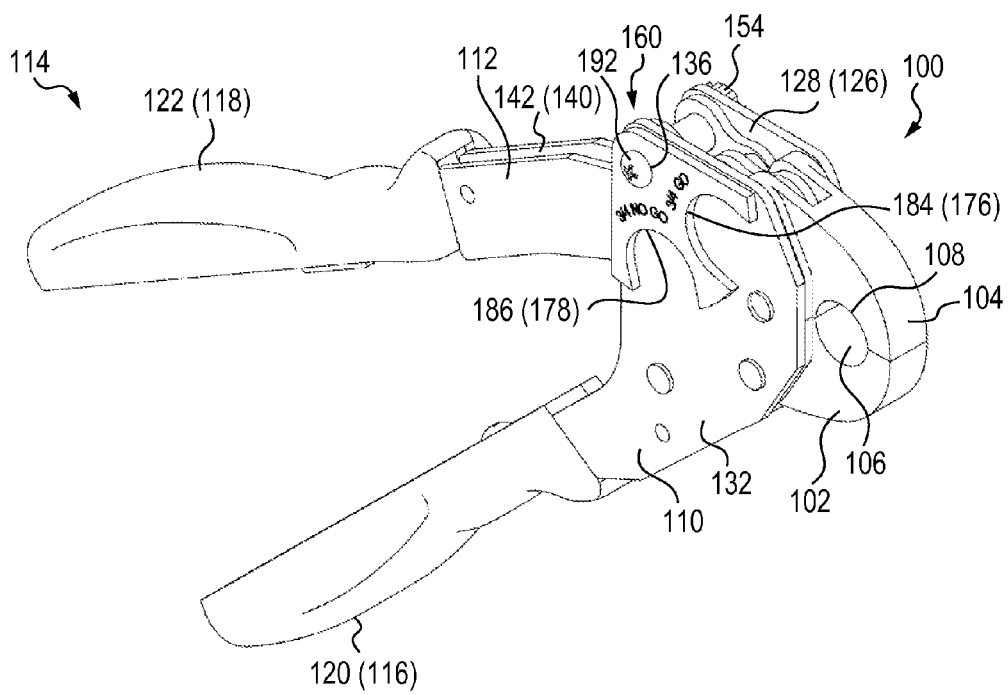
FIG. 24 is a perspective view of another preferred embodiment tool of the present subject matter.
Figure 25:
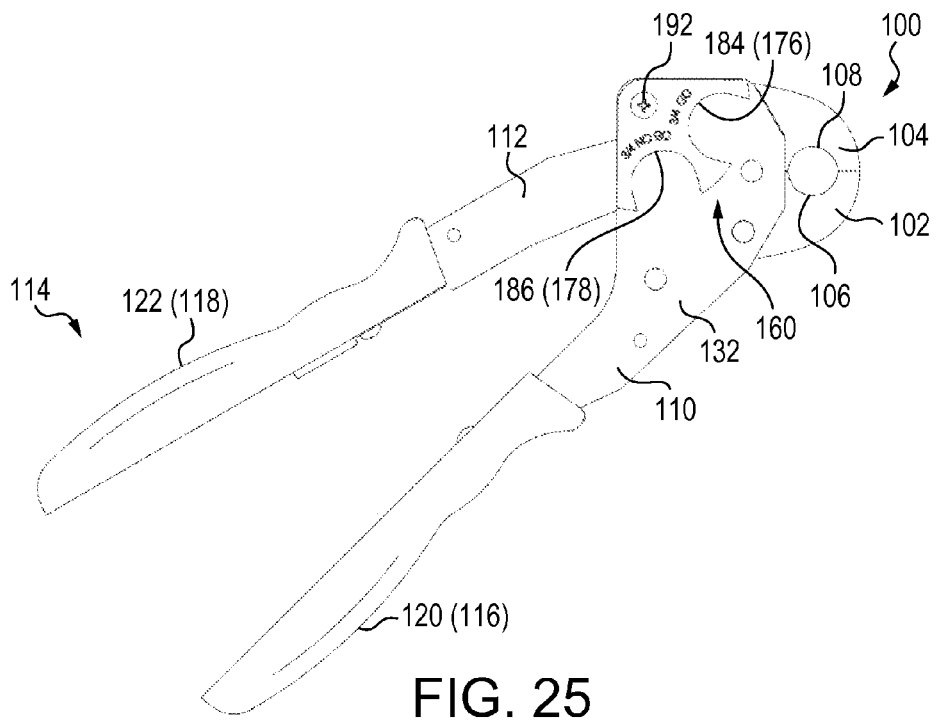
FIG. 25 is an elevational view of the tool of FIG. 24.
Figure 26:
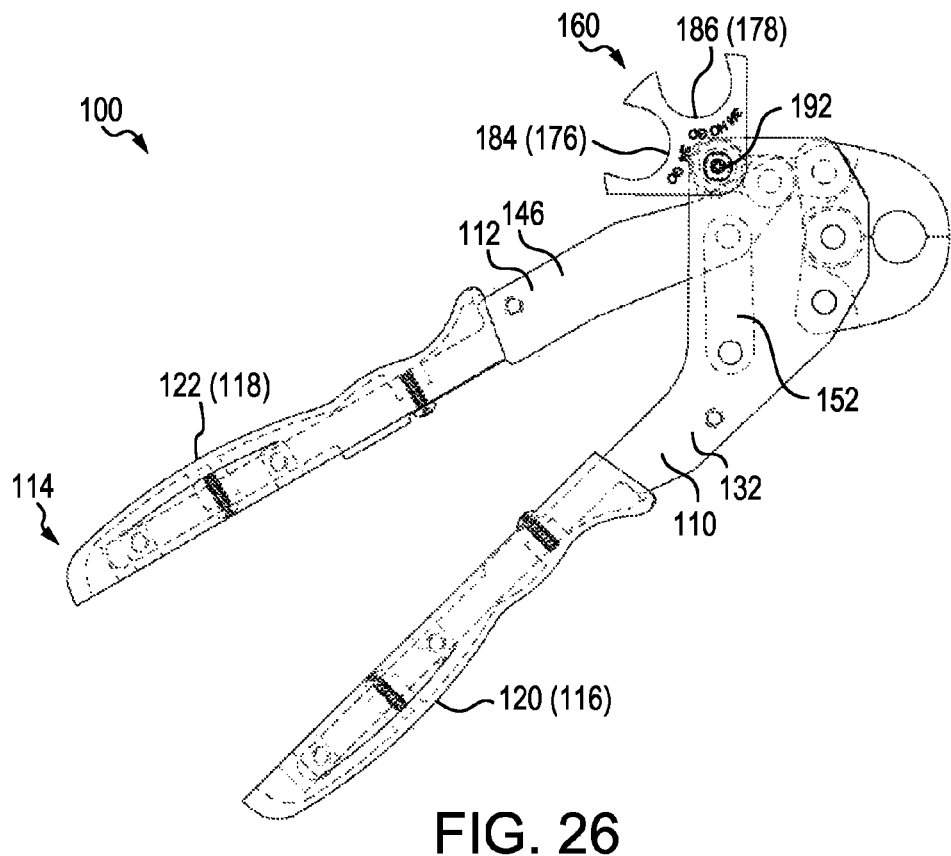
FIG. 26 is an elevational view of the tool of FIG. 24 with a gauge in a measuring position and showing a linkage assembly.
Figure 27:
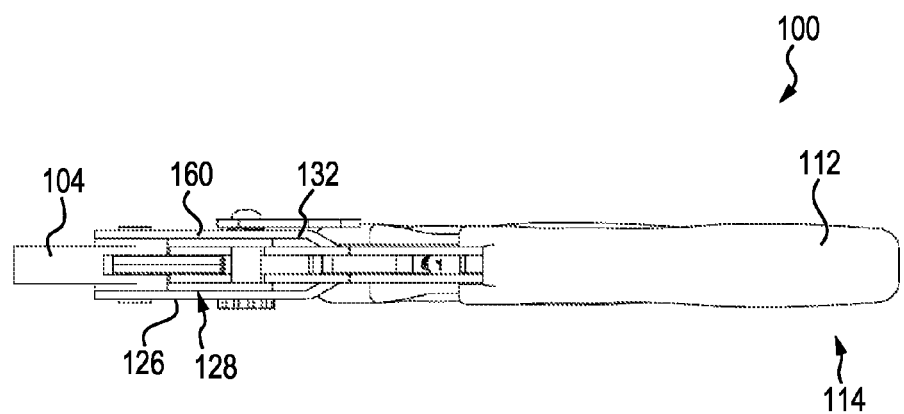
FIG. 27 is a plan view of the tool of FIG. 25.
Figure 28:
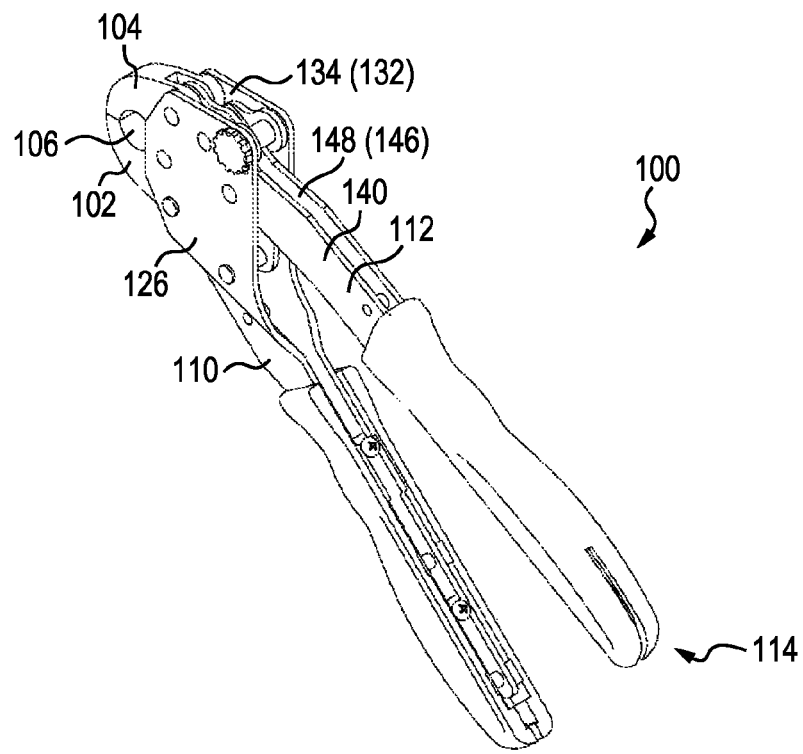
FIG. 28 is a perspective view of another preferred embodiment tool of the present subject matter.
Figure 29:
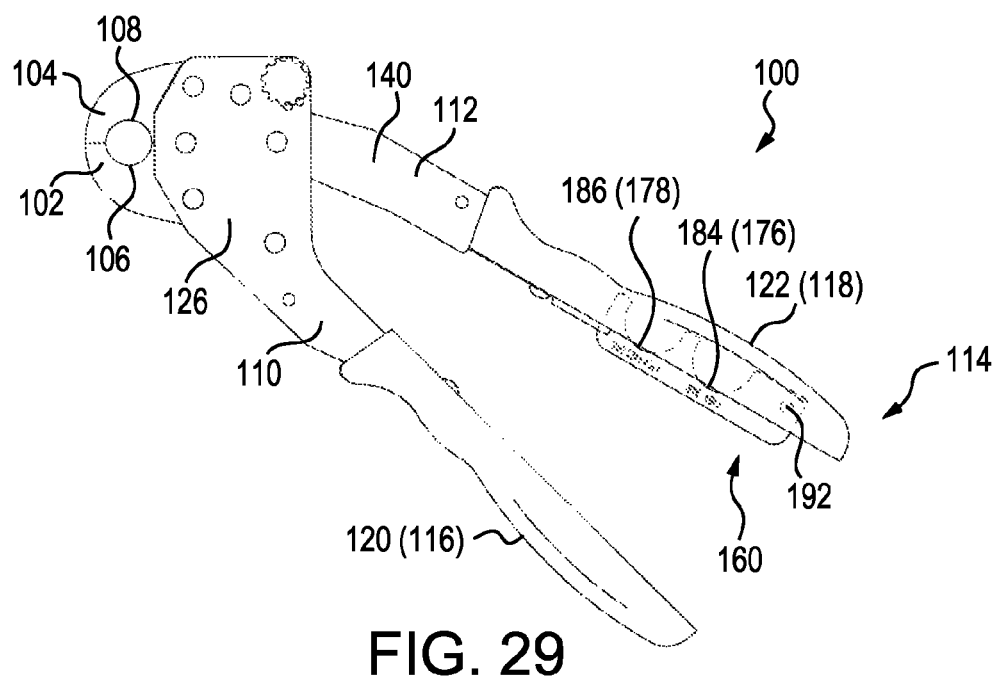
FIG. 29 is an elevational view of the tool of FIG. 28.
Figure 30:
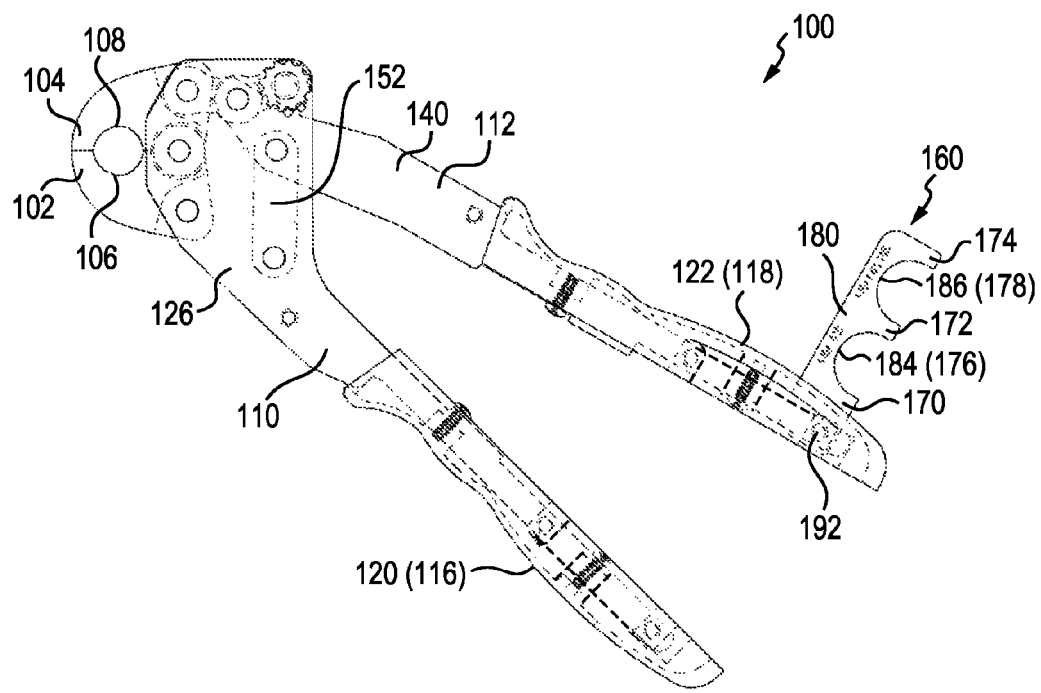
FIG. 30 is an elevational view of the tool of FIG. 28 with a gauge in a measuring position and showing a linkage assembly.
Figure 31:
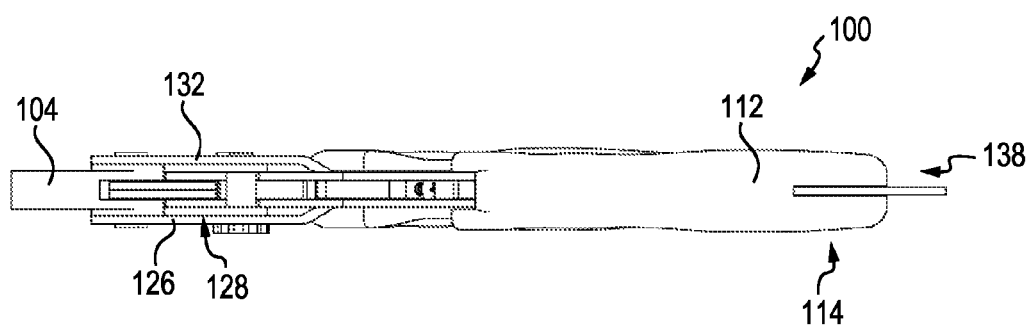
FIG. 31 is a plan view of the tool of FIG. 29.
Figure 32:
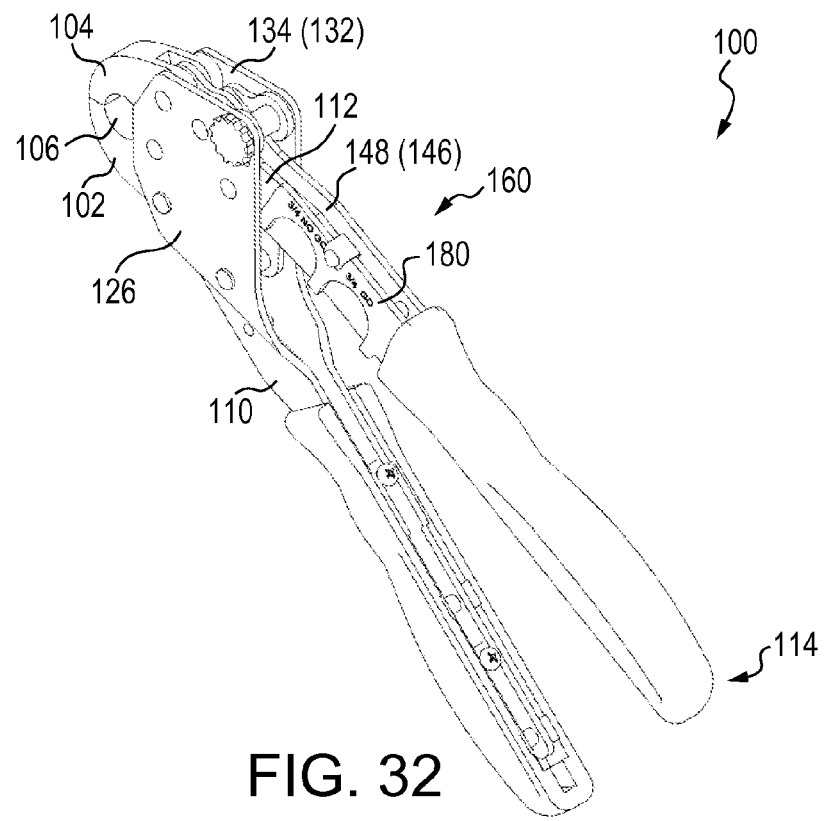
FIG. 32 is a perspective view of another preferred embodiment tool of the present subject matter.
Figure 33:
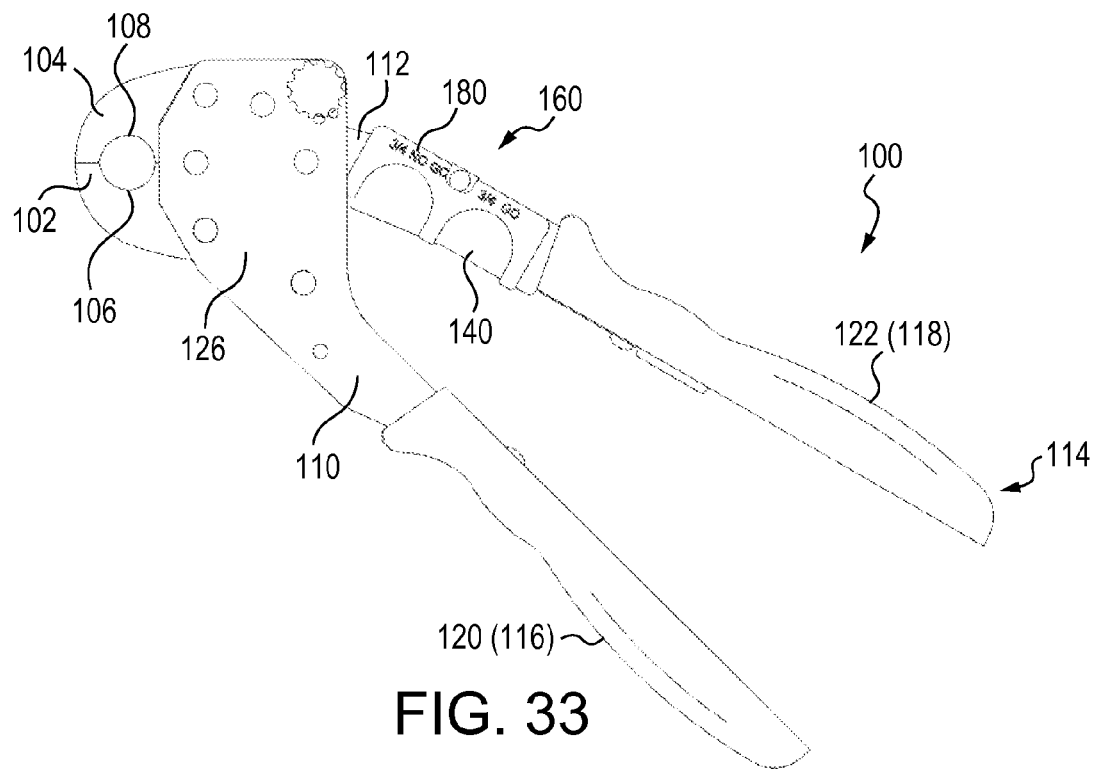
FIG. 33 is an elevational view of the tool of FIG. 32.
Figure 34:
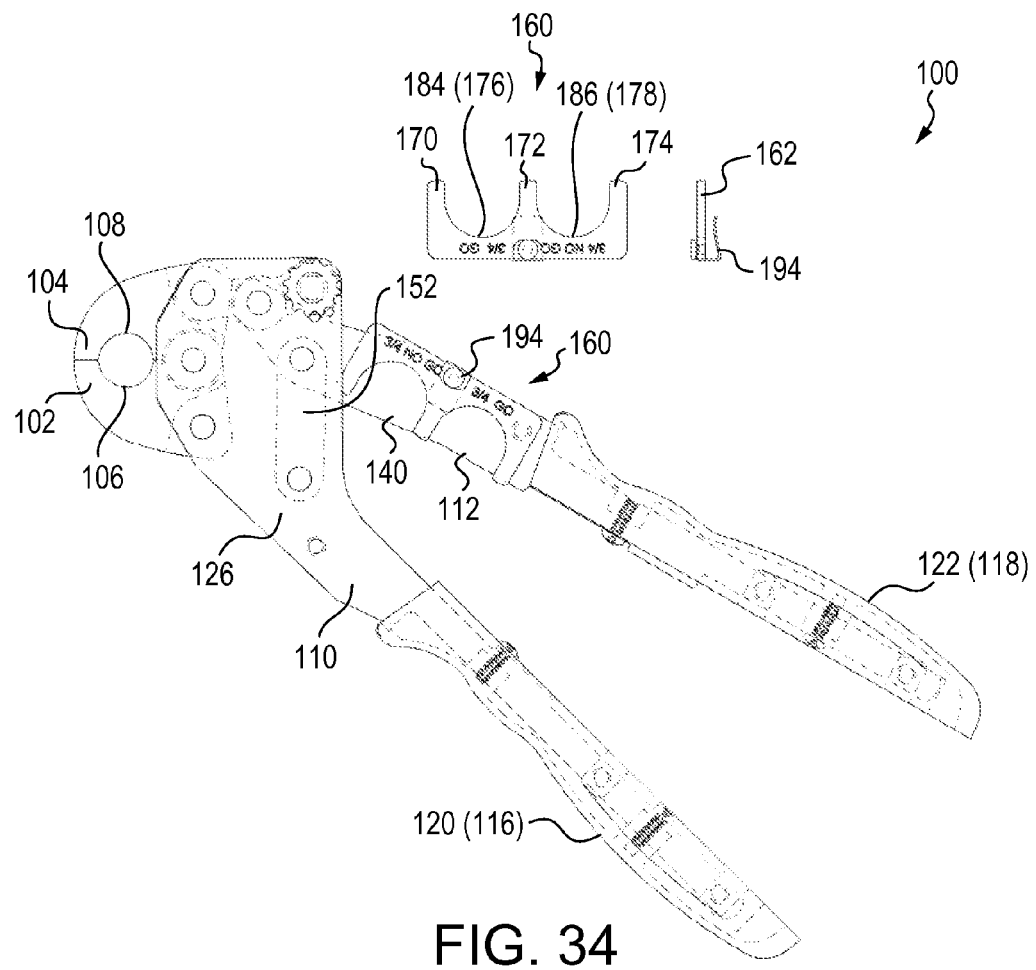
FIG. 34 is an elevational view of the tool of FIG. 32 showing a linkage assembly and also with a gauge removed from and attached to the tool.
Figure 35:
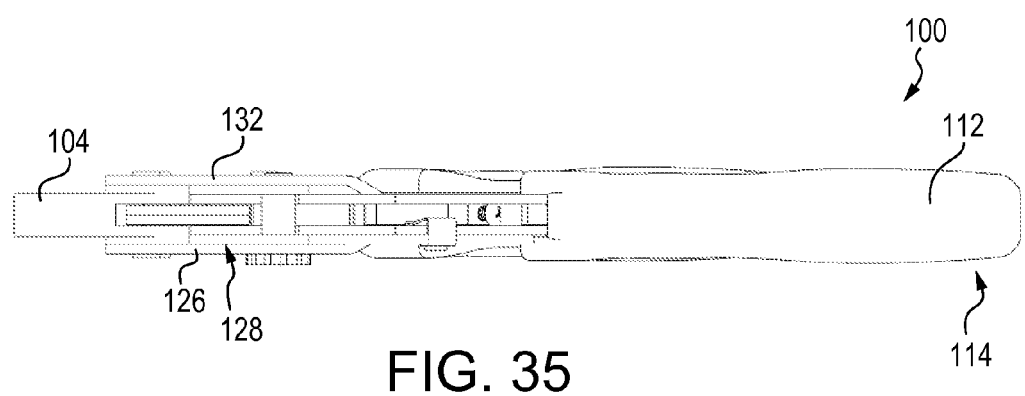
FIG. 35 is a plan view of the tool of FIG. 33.
Figure 36:
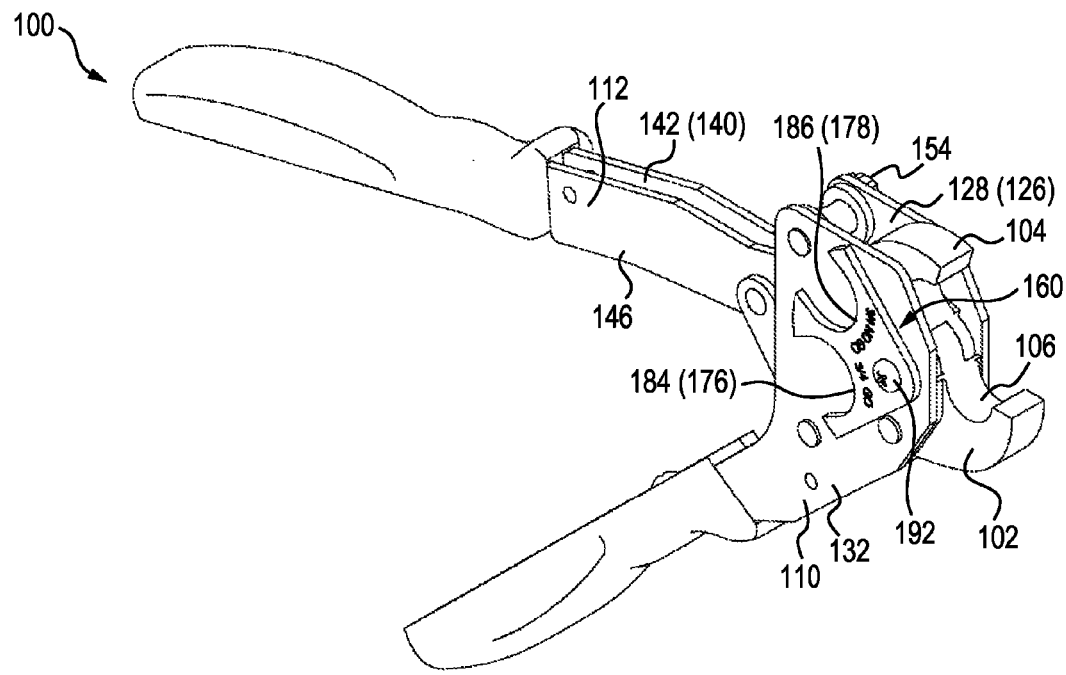
FIG. 36 is another preferred embodiment of the tool of the present subject matter.
Figure 37:
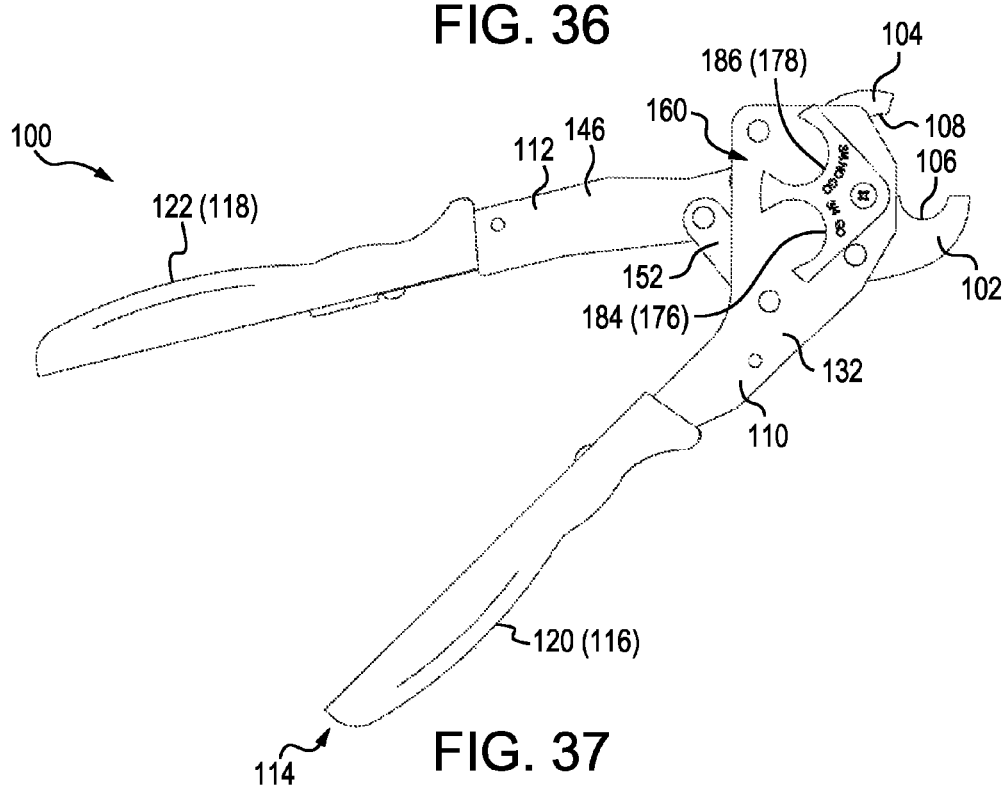
FIG. 37 is an elevational view of the tool of FIG. 36.
Figure 38:
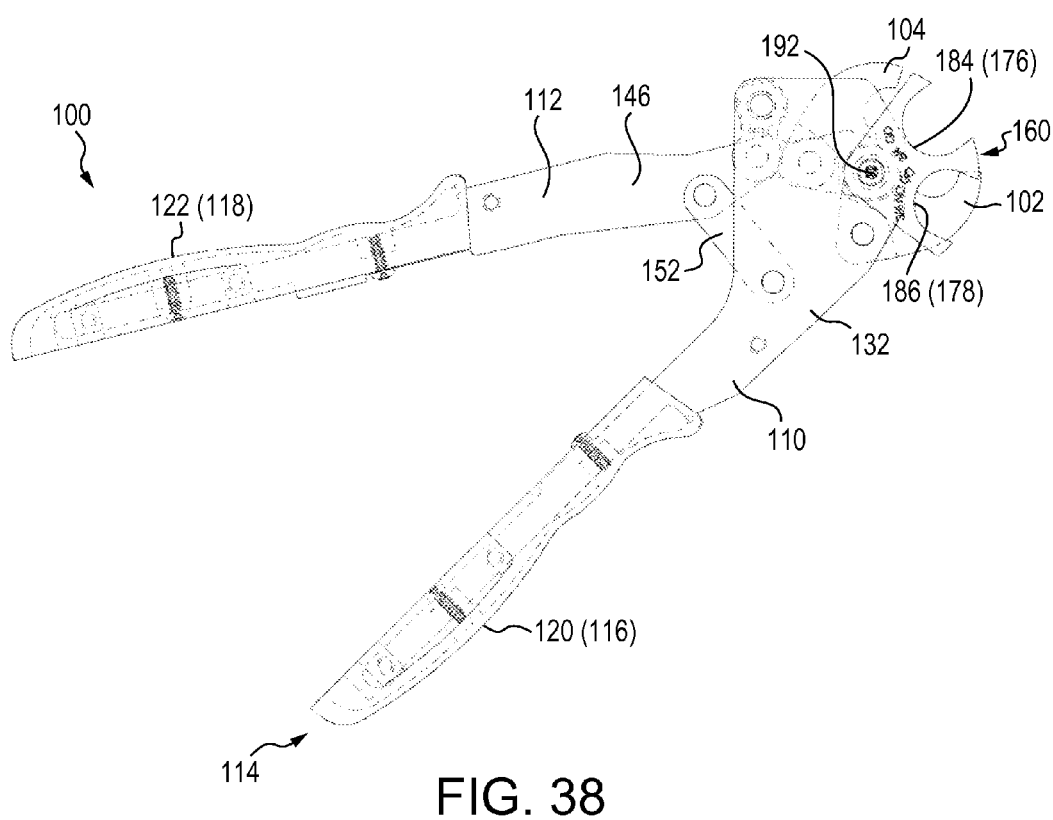
FIG. 38 is an elevational view of the tool of FIG. 36 showing a gauge in a measuring position and also a linkage assembly.
Figure 39:
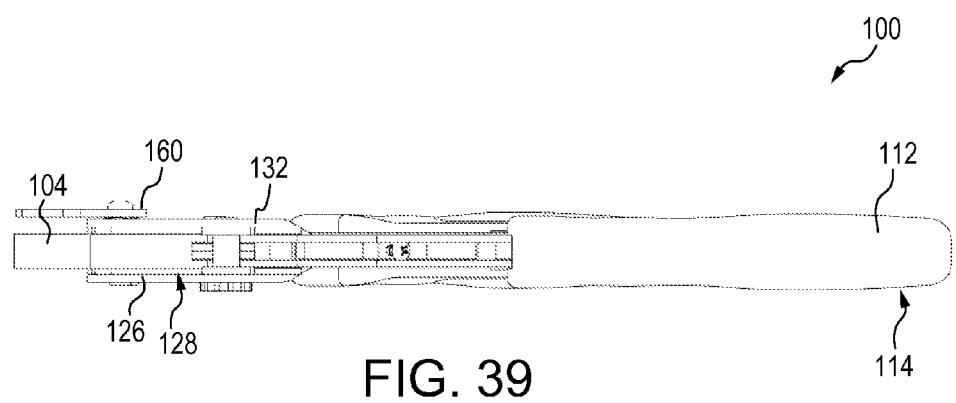
FIG. 39 is a plan view of the tool of FIG. 37.
Figure 40:
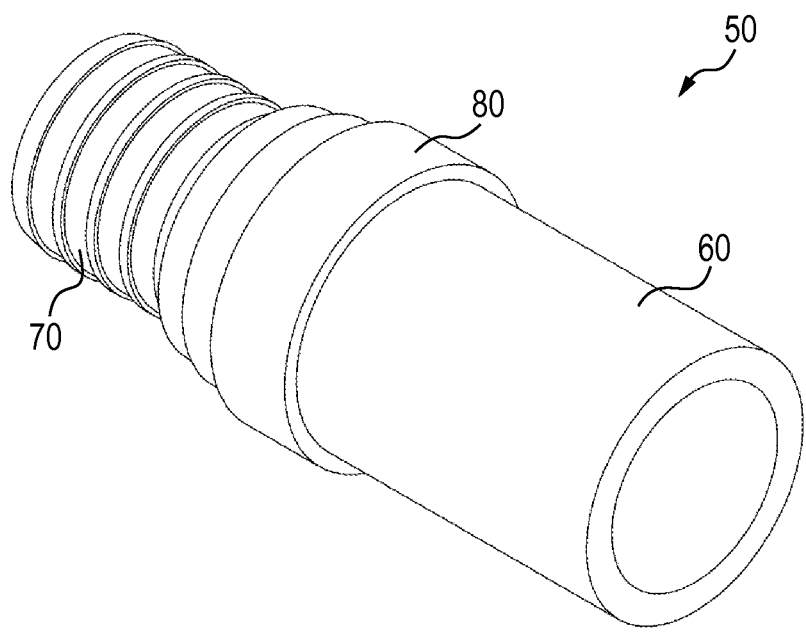
FIG. 40 is a perspective view of a crimped assembly.
Figure 41:
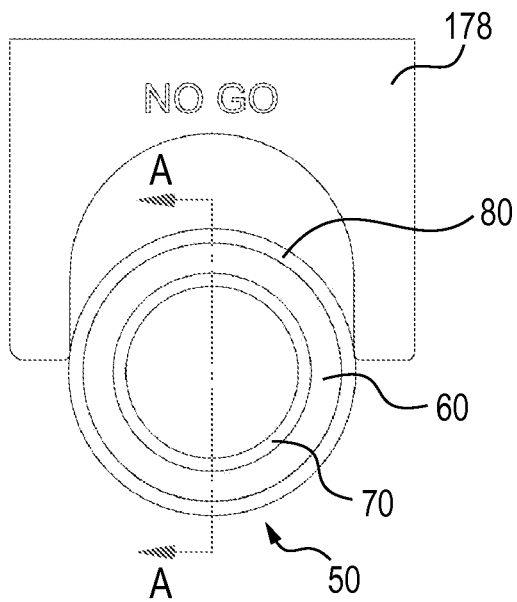
FIG. 41 is an elevational view of a crimped assembly that is within specification.
Figure 42:
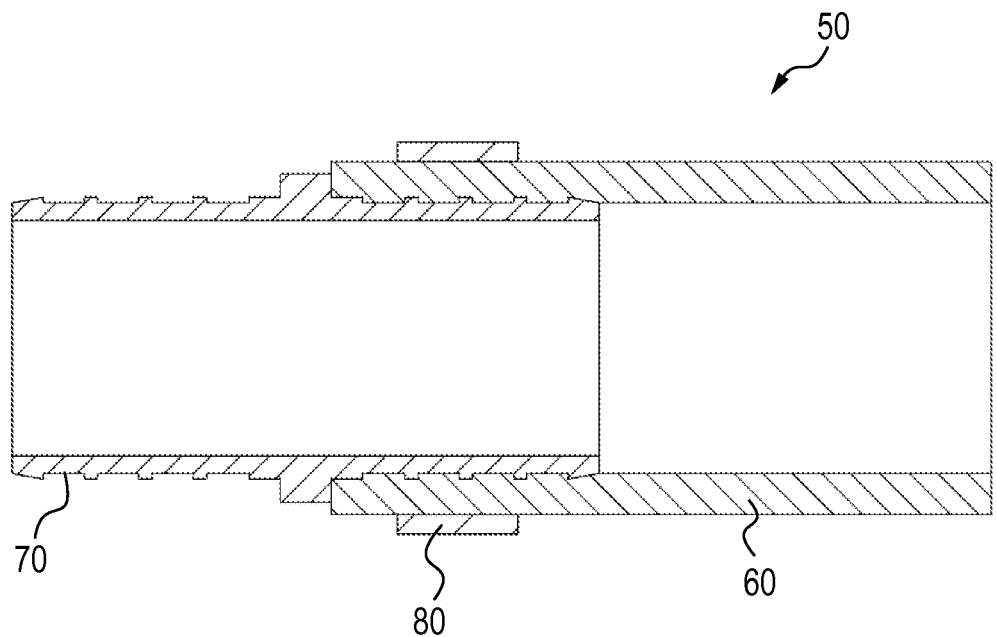
FIG. 42 is a sectional view taken along line A-A of FIG. 41.
Figure 43:
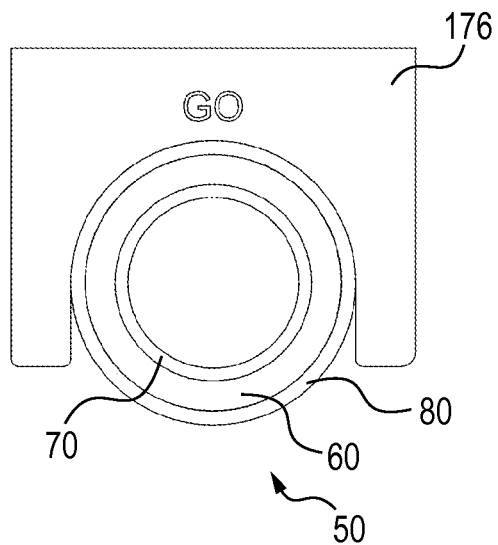
FIG. 43 is an elevational view of a crimped assembly that is within specification.

The first plate member 140 and the second plate member 146 of the second arm 112 can include a gauge bore 144, 150. The gauge bore 144 of the first plate member 140 can be aligned with the gauge bore 150 of the second plate member 146. As best shown in FIGS. 2, 7, and 14, this arrangement allows for the passage of a gauge pin 192 so that the gauge 160 may be affixed to the arm 112. A spacer 196 may be coaxially disposed with the gauge 160 on the gauge pin 192 to provide appropriate thickness to prevent a loose fit of the gauge 160 in the space between surfaces 148, 142. It is contemplated that other types of hardware could be used in place of the gauge pin 192. For example, the gauge pin 192 illustrated in FIG. 13 is a bolt.

As shown in FIGS. 2, 4, 8-10, 13, 15, 18-20, 26, 30, 32-34, and 38, the tool 100 includes the gauge 160. The gauge 160 includes a body 162 and an optional stop member 190 and can be at least partially received within at least one of the arms 110, 112. Because the gauge 160 is at least partially received within at least one of the arms 110, 112, the gauge 160 is always nearby when crimping or forming crimped assemblies. Accordingly, the gauge 160 will not be lost or misplaced. Further, because the gauge 160 is easily accessible by the user, the user is more likely to confirm that the diameter of the crimped assembly is within specification. This ensures that the likelihood of an improper crimp, and subsequent leak, is minimized. Further still, storage of the gauge 160 within the plate members 126, 132 or plate members 140, 146 of the respective arms 110, 112 serves to protect the gauge 160 from damage.

With particular reference to FIGS. 2, 4, 13, and 15, the body 162 of the gauge 160 includes a mounting end 164 that defines a mounting bore 166. The mounting bore 166 allows for pivotal connection of the gauge 160 to the arms 110, 112. As mentioned hereinbefore, the gauge pin 192 extends through the mounting bore 166 to provide for this rotational connection. The mounting end 164 includes a cam surface 168 for contact with a finger spring 200 as will be described hereinafter.

It is noted that the gauge 160 is separate and distinct from the clamping surfaces 106, 108. This arrangement provides numerous advantages. For example, damage to the gauge 160 is less likely to occur since the gauge 160 can be stowed when assessment of the crimped assembly is not occurring. It is believed that certain users may attempt to use a crimp gauge as a cutting tool, when in the field and away from a tool bin. By affixing the gauge 160 to the tool 100 as illustrated, it would be difficult to use the gauge 160 for cutting or other unintended applications. This prevents damage to the gauge 160. Further, because the gauge 160 is separate from the clamping surfaces 106, 108, the gauge 160 can be easily replaced without extensive disassembly or replacement of the tool 100.

With reference to FIGS. 2, 4, 8-10, 13, 15, 26, 30, 32-34, and 38, the gauge 160 includes an interior post 170, a middle post 172, and an exterior post 174. The interior post 170 and the middle post 172 cooperate to define a first size determining member 176. Further, the middle post 172 and the exterior post 174 cooperate to define a second size determining member 178. The gauge 160 can pivot or partially rotate between a stowed position in which the first and second size determining members 176, 178 are within the arm to which the gauge 160 is attached and a measuring position in which the first and second size determining members 176, 178 are displaced from and not within the arm to which the gauge 160 is attached.

When a crimped assembly is properly crimped, the first size determining member 176 (i.e., Go indicator) will allow receipt of the crimped assembly and the second size determining member 178 (i.e., No-Go indicator) will not allow receipt of the crimped assembly. Alternatively, if the crimped assembly is not properly crimped the following scenarios are possible. Entry into the first and second size determining members 176, 178 is denied when the crimp is too large. When the crimp is too small, entry into both the first and second size determining members 176, 178 is allowed. With either of the last two situations, the diameter of the crimped assembly is out of specification and further action is necessary to correct the situation. As will be considered apparent, a maximum distance between the interior post 170 and the middle post 172 (i.e., first size determining member 176; Go indicator) is less than a maximum distance between the middle post 172 and the exterior post 174 (i.e., second size determining member 178; No-Go indicator).

With continued reference to FIGS. 2, 4, 8-10, 15, 18-20, 26, 30, 32-34, and 38, the gauge 160 can include an indicia face 180 with indicia. Further, the gauge 160 includes a non-indicia face 182 that is opposite the indicia face 180 and generally parallel to the indicia face 180. The indicia face 180 is also generally parallel to the interior surfaces 128, 134, 142, 148. The indicia on the indicia face 180 provides visual indication to the user of the relative dimensional quality of the crimped assembly. The gauge 160 can include indicia proximal to the first and/or second size determining members 176, 178 so that a user of the tool 100 can differentiate between the first and second size determining members 176, 178.

The first size determining member 176 defines a first measuring surface 184 which extends between the oppositely directed indicia face 180 and the non-indicia face 182 of the gauge 160. Thus, the first measuring surface 184 constitutes a recessed edge extending between the faces 180 and 182. Similarly, the second size determining member 178 defines a second measuring surface 186 which extends between the oppositely directed indicia face 180 and the non-indicia face 182 of the gauge 160. Thus, the second measuring surface 186 constitutes a recessed edge extending between the faces 180 and 182. Each of the surfaces (or edges) 184 and 186 preferably extends transversely to the indicia face 180 and the non-indicia face 182, and hence are "flat" edges. That is, although the surfaces (or edges) 184 and 186 include arcuate regions, the surfaces 184 and 186 extend directly between the faces 180 and 182 of the gauge 160. By having a flat or non-pointed surface, the first and second measuring surfaces 184, 186 do not damage the crimped area which is to be measured or assessed.

Although the discussion thus far has focused on a gauge 160 that includes a first size determining member 176 and a second size determining member 178, it is understood that other arrangements are possible. For example, as shown by the tool 100 of FIGS. 18-23, the gauge 160 may include only a second size determining member 178. In this instance, the user would only be informed if the crimp diameter of the crimped assembly is too small. The user could confirm that contact occurred between the first jaw 102 and the second jaw 104 to ensure that the crimp diameter was not too large.

The gauge 160 can also include a stop member 190. The stop member 190 prevents rotation of the gauge 160 through the arm 112 and past the stowed position of the gauge 160. Further, the stop member 190 allows only limited rotation of the gauge 160 about the arm to which the gauge 160 is pivotably attached. Because the stop member 190 limits rotation of the gauge 160, operating performance of the tool 100 and gauge 160 is maintained. Specifically, since the rotation of the gauge 160 is limited, the gauge 160 experiences less frictional wear due to contact with other components during deployment.

Further, the stop member 190 prevents the gauge 160 from rotating completely past the plate members of the arm to which the gauge 160 is attached, thereby increasing usability of the gauge 160. Additionally, the stop member 190 provides an easy gripping region to move the gauge 160 between the stowed position and the measuring position. This is especially useful when the user is wearing protective gloves while operating the tool 100.

The stop member 190 includes a stop face 191 that is generally perpendicular to the indicia face 180. The stop face 191 contacts at least one of the plate members 140, 146 of the second arm 112 when the gauge 160 is mounted to the second arm 112. Alternatively, the stop face 191 contacts at least one of the plate members 126, 132 of the first arm 110 when the gauge 160 is mounted to the first arm 110.

Generally, the gauge 160 has been described as having a rectangular shape with two inwardly extending arcuate edges, i.e. the first and second size determining members 176, 178. However, other shapes are possible. For example, as shown in the tool 100 of FIGS. 24-27 and 36-39, the gauge 160 can have a triangular shape. This shape results in less material being used during the manufacturing process of the gauge 160, thereby reducing weight and overall cost of the tool 100. It is also noted that the gauge 160 can have a generally L-shaped cross-section.

With reference to FIGS. 1-7, the tool 100 can include a finger spring 200 that is disposed between the gripping surfaces 120, 122 of the grips 116, 118 of the arms 110, 112. The finger spring 200 has a free end 202 and a fixed end 204. Near the fixed end 204, a mounting bore 206 is defined. The mounting bore 206 allows for cantilever attachment of the finger spring 200 to the arm 112 with a fastener. Alternatively, the finger spring 200 could be formed so as to be integral with a grip or arm.

The finger spring 200 engages the cam surface 168 of the gauge 160 to provide frictional resistance to the gauge 160 as the gauge 160 is rotated, i.e. displaced between a stowed position and a measuring position. Thus, the finger spring 200 partially retards rotation of the gauge 160. The gauge 160 of FIGS. 1-7 has a range of motion of about 90° when being rotated between the deployed and measuring positions. The finger spring 200 is preferably disposed within the arm 112 when the gauge 160 is stowed and not completely in the arm 112 when the gauge 160 is being rotated between the stowed and measuring positions. Preferably, the free end 202 of the finger spring 200 is biased so as to be disposed within the arm to which the gauge 160 is attached when the gauge 160 is in the stowed position, and displaced from and not within the arm to which the gauge 160 is attached when the gauge 160 is rotated between the stowed position and the measuring position. This reduces the likelihood that the finger spring 200 will inadvertently snag or catch objects when the gauge 160 is stowed. Alternatively, the extension of the finger spring 200 from the arm 112 serves as an additional visual indicator that the gauge 160 is not stowed. Because of the finger spring 200, the gauge 160 will not inadvertently be deployed. This prevents accidental damage to the gauge 160.

Furthermore, the embodiments of the tool 100 discussed thus far have shown the gauge 160 pivotably mounted to the second arm 112. However, other locations are possible, and will be described herein below.

In FIGS. 8-11, the gauge 160 is fixed to the second arm 112 between the grip 118 and the second jaw 104. Thus, pivotable movement between the gauge 160 and the second arm 112 is not possible with this embodiment. While illustrated as being fixed to the second arm 112, the gauge 160 could alternatively be fixed to the first arm 110. The gauge 160 shown in FIGS. 8-11 may be attached to the second arm 112 via any number of ways including, for example, fasteners or adhesive. Alternatively, the gauge 160 of FIGS. 8-11 may be integral to the arm 112.

With reference to FIGS. 12-17, the gauge 160 could be rotatably attached to the first arm 110. As illustrated, the first and second plate members 126, 132 of the first arm 110 define alternate gauge bores 130, 136 that are aligned. The alternate gauge bores 130, 136 of the first arm 110 receive the gauge pin 192 to allow pivotable movement of the gauge 160.

Figure 44:
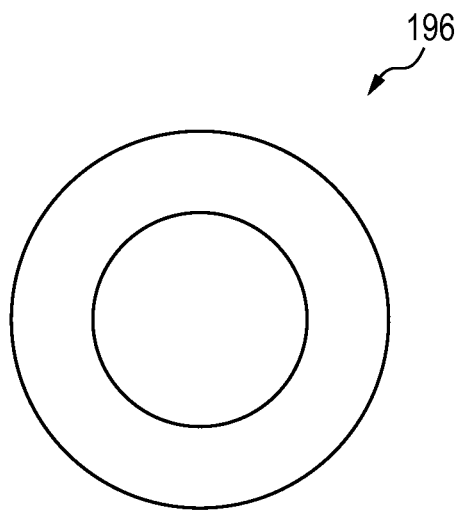
FIG. 44 is a plan view of a wave washer.
Figure 45:
FIG. 45 is an elevational view of the wave washer of FIG. 44.

As shown in FIGS. 12-17, 24-27, and 36-39, the spacer can be replaced with a wave washer. The wave washer 196 of FIGS. 12-17, 24-27, 36-39 is also individually shown in FIGS. 44-45. The wave washer 196 can have a wave in the axial direction so as to provide spring pressure when compressed. Like the spacer, the wave washer may be coaxially disposed with the gauge 160 on the gauge pin 192. The wave washer 196 can provide frictional resistance to rotation of the gauge 160, thereby partially retarding rotation of the gauge 160 about the arm 110, 112 to which the gauge 160 is attached. It is noted that a spacer or wave washer may be used depending on the requirements of the tool 100.

As described hereinbefore, the gauge pin 192 may be of a traditional bolt design. As illustrated, the gauge 160 would be disposed opposite the interior surface 134 of the second plate member 132 of the first arm 110. The gauge 160 of FIGS. 12-17 has a range of motion of about 180° with respect to the arm 110 when being rotated between the deployed and measuring positions.

As also described hereinbefore, the gauge 160 of the tool 100 shown in FIGS. 18-23 includes a first and second size determining members 176, 178. However, in the tool 100 of FIGS. 18-23, the first size determining member 176 is separate from the second size determining member 178. In particular, the first size determining member 176 can be rotated independently of the second size determining member 178. Thus, even though the first and second size determining members 176, 178 share a common rotational axis of the gauge pin 192, the first and second size determining members 176, 178 may be separately deployed and stowed. As mentioned hereinbefore, the gauge pin 192 may be a bolt. It is noted that the first and second size determining members 176, 178 of the gauge 160 of FIGS. 18-23 each has a range of motion of about 90° with respect to the arm 112 when being rotated between the deployed and measuring positions.

As previously mentioned with reference to FIGS. 24-27 and 36-39, the gauge 160 of tool 100 can have a triangular shape. As illustrated, the gauge 160 of FIGS. 24-27 is rotatably attached to the first arm 110 and not disposed between the first plate member 126 and the second plate member 132 of the first arm 110. However, as shown in the tool 100 of FIGS. 36-39, the gauge 160 is rotatably attached to the first arm 110 and disposed so that the second plate member 132 of the first arm 110 is between the gauge 160 and the first plate member 126 of the first arm 110. The gauges 160 of FIGS. 24-27 and 36-39 have a range of motion of about 360° when being rotated between the deployed and measuring positions.

With reference to the tool 100 shown in FIGS. 28-31, the gauge 160 is rotatably attached to the second arm 112. However, the gauge 160 of FIGS. 28-31 is disposed on the second arm 112 at the gripping end 114 of the tool 100. Specifically, the gauge 160 is received in a gauge slot 138 defined by the grip 118. Further, the gauge 160 is received in the gauge slot 138 also has a range of motion of about 270° with respect to the arm 112 when being rotated between the deployed and measuring positions. It is recognized that in certain applications, it may be desirable to limit the range of motion to 180' with respect to the arm 112.

The gauge 160 of FIGS. 32-35 is detachably connected to the second arm 112. In particular, a clip 194 extends from the body 162 of the gauge 160 to form a U-shape in cross-section. In a relaxed form, the distance between an inner surface of the clip 194 and the body 162 is slightly less than a thickness of the first plate member 140 of the second arm 112. However, the clip 194 may be elastically deformed to increase a distance between the inner surface of the clip 194 and the body 162 so as to receive the first plate member 140 of the second arm 112 and provide retention of the gauge 160 to the arm 112. Although illustrated as being detachably connected to the second arm 112, it will be understood that the gauge 160 could be detachably connected to the first arm 110. Thus, the gauge 160 of FIGS. 32-35 is selectively removable from the arms 110, 112.

As mentioned hereinbefore, details as to forming crimped assemblies using PEX tubing are provided in *ASTM Standard F 1807, 2008, "Standard Specifications for Metal Insert Fittings Utilizing a Copper Crimp Ring for SDR9 Cross-linked Polyethylene (PEX) Tubing,"* ASTM International, West Conshohocken, Pa., herein incorporated by reference.

Many other benefits will no doubt become apparent from future application and development of this technology.

All patents, applications, articles, and standards noted herein are hereby incorporated by reference in their entirety.

As described hereinabove, the present subject matter solves many problems associated with previous type crimping tool devices. However, it will be appreciated that various changes in the details, materials and arrangements of parts, which have been herein described and illustrated in order to explain the nature of the subject matter, may be made by those skilled in the art without departing from the principle and scope of the subject matter, as expressed in the appended claims.

What is claimed is:

1. A tool for crimping at least two members together and confirming that the crimp is acceptable, the tool comprising:
   a pair of opposed clamping jaws, each of the damping jaws including a crimping surface that contacts at least one of the members when crimping the members together;
   a pair of opposed arms that move the crimping surfaces of the opposed clamping jaws toward one another to define a crimping position and away from one another to define a release position;
   a gauge defining a first size determining member allowing receipt of the at least two members crimped together and a second size determining member rejecting receipt of the at least two members crimped together, wherein the gauge is separate from the crimping surfaces and is attached to one of the arms; and
   a finger spring that provides frictional resistance to the gauge to partially retard rotation of the gauge about the arm to which the gauge is attached.

2. The tool of claim 1, wherein the gauge is adapted to rotate between a stowed position in which the first and second size determining members are within the arm to which the gauge is attached and a measuring position in which the first and second size determining members are displaced from the arm to which the gauge is attached.

3. The tool of claim 2, wherein the finger spring is cantileverly supported by the arm to which the gauge is attached so as to define a fixed end and a free end of the finger spring.

4. The tool of claim 3, wherein the gauge including a mounting end that is pivotably connected to the arm to which the gauge is attached, wherein the mounting end includes a cam surface that selectively engages the free end of the finger spring when the gauge is rotated between the stowed position and the measuring position.

5. The tool of claim 3, wherein the free end of the finger spring is biased so as to be disposed within the arm to which the gauge is attached when the gauge is in the stowed position, and displaced from and not within the arm to which the gauge is attached when the gauge is rotated between the stowed position and the measuring position.

6. The tool of claim 1, wherein the pair of opposed arms each including a gripping surface adapted to receive force to cause the crimping surfaces of the damping jaws to move toward one another.

7. The tool of claim 6, wherein the finger spring is disposed between the gripping surfaces of the opposed arms.

8. A tool for crimping at least two members together and confirming that the crimp is acceptable, the tool comprising:
   a pair of opposed clamping jaws, each of the clamping jaws including a crimping surface that contacts at least one of the members when crimping the members together;
   a pair of opposed arms that move the crimping surfaces of the opposed clamping jaws toward one another to define a crimping position and away from one another to define a release position; and
   a gauge defining a first size determining member allowing receipt of the at least two members crimped together and a second size determining member rejecting receipt of the at least two members crimped together, wherein the gauge is at least partially received within one of the arms.

9. The tool of claim 8, wherein the gauge is adapted to rotate between a stowed position in which the first and second size determining members are within the arm to which the gauge is attached and a measuring position in which the first and second size determining members are displaced from and not within the arm to which the gauge is attached.

10. The tool of claim 9, wherein the pair of opposed arms each include a gripping end that is opposite an end adjacent the clamping jaws, the gripping end of each of the opposed arms having a grip adapted to receive force to cause the crimping surfaces of the clamping jaws to move toward one another, the grip defining a gauge slot that receives the gauge when the gauge is in the stowed position.

11. The tool of claim 9, wherein the gauge includes an indicia face with indicia proximal to the first and second size determining members so that a user of the tool can differentiate between the first and second size determining members, the gauge also including a non-indicia face that is opposite the indicia face, and a measuring surface that extends from the indicia face to the non-indicia face.

12. The tool of claim 9, wherein the opposed arms are each defined by plate members spaced apart from one another so that the gauge can be received within the arm to which the gauge is pivotably attached.

13. The tool of claim 12, wherein the plate members each include interior surfaces that face one another and are generally parallel to one another.

14. The tool of claim 13, wherein the gauge includes an indicia face with indicia proximal to the first and second size determining members so that a user of the tool can differentiate between the first and second size determining members and an oppositely directed non-indicia face, wherein the indicia face and the non-indicia face are generally parallel to one another and to the interior surfaces of the arm to which the gauge is pivotably attached.

15. A tool for crimping at least two members together and confirming that the crimp is acceptable, the tool comprising:
    a pair of opposed clamping jaws, each of the clamping jaws including a crimping surface that contacts at least one of the members when crimping the members together;
    a pair of opposed arms that move the crimping surfaces of the opposed clamping jaws toward one another to define a crimping position and away from one another to define a release position; and
    a gauge pivotably attached to one of the arms, the gauge including a body that defines a first size determining member allowing receipt of the members crimped together and a second size determining member rejecting receipt of the members crimped together, the gauge further including a stop member that allows only limited rotation of the gauge about the arm to which the gauge is pivotably attached.

16. The tool of claim 15, wherein the opposed arms are each defined by plate members spaced apart from one another so that the gauge can at least partially be received within the arm to which the gauge is pivotably attached, wherein the stop member prevents the gauge from rotating completely past the plate members.

17. The tool of claim 16, wherein the stop member extends perpendicularly from the body of the gauge so that the gauge has an L-shaped cross-section.

18. The tool of claim 15, wherein the body defines a pivot bore that receives a gauge pin for attachment of the gauge to the arm, wherein a middle post is between the pivot bore and the exterior post.

19. The tool of claim 15, wherein the gauge includes an indicia face with indicia proximal to the first and second size determining members so that a user of the tool can differentiate between the first and second size determining members, the stop member includes a stop face adapted for contact with the arm to which the gauge is pivotably attached so as to prevent complete rotation of the gauge, wherein the stop face is generally perpendicular to the indicia face.

20. The tool of claim 19, wherein the gauge includes a non-indicia face that is opposite the indicia face, and wherein the first size determining member defines a first measuring surface that transversely extends between the indicia face and the non-indicia face.

21. A tool for crimping at least two members together and confirming that the crimp is acceptable, the tool comprising:
    a pair of opposed clamping jaws, each of the clamping jaws including a crimping surface that contacts at least one of the members when crimping the members together;
    a pair of opposed arms that move the crimping surfaces of the opposed clamping jaws toward one another to define a crimping position and away from one another to define a release position;
    a gauge defining a first size determining member allowing receipt of the at least two members crimped together and a second size determining member rejecting receipt of the at least two members crimped together, wherein the gauge is rotatably attached to one of the arms with a gauge pin; and
    a wave washer coaxially disposed with the gauge on the gauge pin so as to provide frictional resistance to the gauge to partially retard rotation of the gauge about the arm to which the gauge is attached.

22. A tool for crimping at least two members together and confirming that the crimp is acceptable, the tool comprising:
    a pair of opposed damping jaws, each of the damping jaws including a crimping surface that contacts at least one of the members when crimping the members together;
    a pair of opposed arms that move the crimping surfaces of the opposed damping jaws toward one another to define a crimping position and away from one another to define a release position; and
    a gauge defining a first size determining member allowing receipt of the at least two members crimped together and a second size determining member rejecting receipt of the at least two members crimped together, wherein the gauge is selectively removable from one of the arms.

* * * * *